US012756494B2

(12) United States Patent
Huang et al.

(10) Patent No.: US 12,756,494 B2
(45) Date of Patent: Oct. 6, 2026

(54) MODULATION RATE CONTROL FOR MULTIPLEXING

(71) Applicant: QUALCOMM Incorporated, San Diego, CA (US)

(72) Inventors: Yi Huang, San Diego, CA (US); Jing Sun, San Diego, CA (US); Mostafa Khoshnevisan, San Diego, CA (US); Jing Jiang, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 279 days.

(21) Appl. No.: 18/607,096

(22) Filed: Mar. 15, 2024

(65) Prior Publication Data

US 2025/0293796 A1 Sep. 18, 2025

(51) Int. Cl.

| | |
|---|---|
| ***H04L 1/00*** | (2006.01) |
| ***H04W 72/21*** | (2023.01) |
| ***H04W 72/232*** | (2023.01) |

(52) U.S. Cl.

CPC ........... *H04L 1/0004* (2013.01); *H04W 72/21* (2023.01); *H04W 72/232* (2023.01)

(58) Field of Classification Search

CPC ...... H04L 1/0004; H04L 1/001; H04W 72/21; H04W 72/232

See application file for complete search history.

(56) References Cited

U.S. PATENT DOCUMENTS

| | | | | |
|---|---|---|---|---|
| 2011/0280222 | A1* | 11/2011 | Nam | H04L 1/0073 370/335 |
| 2015/0312071 | A1* | 10/2015 | Chen | H04L 1/0003 370/329 |
| 2019/0150179 | A1 | 5/2019 | Soriaga et al. | |

OTHER PUBLICATIONS

International Search Report and Written Opinion—PCT/US2025/017251—ISA/EPO—May 26, 2025.

Qualcomm Incorporated: "Multiplexing of PUCCH and PUSCH", 3GPP TSG RAN WG1 Meeting 91, R1-1721387, 3rd Generation Partnership Project, Mobile Competence Centre, 650, Route Des Lucioles, F-06921, Sophia-Antipolis Cedex, France, Nov. 27, 2017, 11 Pages, XP051363831, p. 5-p. 6, figure 2.

* cited by examiner

*Primary Examiner* — Mohammad S Anwar

(74) *Attorney, Agent, or Firm* — Holland & Hart LLP

(57) ABSTRACT

Methods, systems, and devices for wireless communications are described. A user equipment (UE) may receive an indication to multiplex an uplink control message using a first modulation and coding scheme (MCS) on an uplink data channel associated with a second MCS different from the first MCS. The UE may multiplex the control message on the data channel and transmit the multiplexed message to a network entity, for example.

20 Claims, 14 Drawing Sheets

MODULATION RATE CONTROL FOR MULTIPLEXING

FIELD OF TECHNOLOGY

The following relates to wireless communications, including modulation rate control for multiplexing.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

A method for wireless communications by a user equipment (UE) is described. The method may include receiving, from a network entity, a downlink control message indicating the UE to multiplex an uplink control message associated with a first modulation and coding scheme (MCS) on an uplink data channel associated with a second MCS, where the first MCS has a first modulation order and the second MCS has a second modulation order that is different than the first modulation order, multiplexing, based on the downlink control message, the uplink control message associated with the first MCS on the uplink data channel associated with the second MCS to generate a multiplexed uplink message including the uplink control message multiplexed with uplink data of the uplink data channel, and transmitting, via a wireless communications link between the network entity and the UE, the multiplexed uplink message.

A UE for wireless communications is described. The UE may include one or more memories storing processor executable code, and one or more processors coupled with the one or more memories. The one or more processors may individually or collectively be operable to execute the code to cause the UE to receive, from a network entity, a downlink control message indicating the UE to multiplex an uplink control message associated with a first MCS on an uplink data channel associated with a second MCS, where the first MCS has a first modulation order and the second MCS has a second modulation order that is different than the first modulation order, multiplexing, base at least in part on the downlink control message, the uplink control message associated with the first MCS on the uplink data channel associated with the second MCS to generate a multiplexed uplink message including the uplink control message multiplexed with uplink data of the uplink data channel, and transmit, via a wireless communications link between the network entity and the UE, the multiplexed uplink message.

Another UE for wireless communications is described. The UE may include means for receiving, from a network entity, a downlink control message indicating the UE to multiplex an uplink control message associated with a first MCS on an uplink data channel associated with a second MCS, where the first MCS has a first modulation order and the second MCS has a second modulation order that is different than the first modulation order, means for multiplexing, based on the downlink control message, the uplink control message associated with the first MCS on the uplink data channel associated with the second MCS to generate a multiplexed uplink message including the uplink control message multiplexed with uplink data of the uplink data channel, and means for transmitting, via a wireless communications link between the network entity and the UE, the multiplexed uplink message.

A non-transitory computer-readable medium storing code for wireless communications is described. The code may include instructions executable by one or more processors to receive, from a network entity, a downlink control message indicating the UE to multiplex an uplink control message associated with a first MCS on an uplink data channel associated with a second MCS, where the first MCS has a first modulation order and the second MCS has a second modulation order that is different than the first modulation order, multiplexing, base at least in part on the downlink control message, the uplink control message associated with the first MCS on the uplink data channel associated with the second MCS to generate a multiplexed uplink message including the uplink control message multiplexed with uplink data of the uplink data channel, and transmit, via a wireless communications link between the network entity and the UE, the multiplexed uplink message.

Some examples of the method, UEs, and non-transitory computer-readable medium described herein may further include operations, features, means, or instructions for receiving, as part of the downlink control message, an indication of a data MCS indicator associated with the second MCS and an MCS backoff value, where the first MCS may be based on the data MCS indicator and the MCS backoff value.

In some examples of the method, UEs, and non-transitory computer-readable medium described herein, the UE may be configured with an MCS table including a set of indexes each associated with a respective MCS, the data MCS indicator indicates a second index from the set of indexes that may be associated with the second MCS, and a difference between the second index and the MCS backoff value may be equal to a first index of the set of indexes that may be associated with the first MCS.

Some examples of the method, UEs, and non-transitory computer-readable medium described herein may further include operations, features, means, or instructions for receiving a second downlink control message that configures the MCS table at the UE.

In some examples of the method, UEs, and non-transitory computer-readable medium described herein, the UE may be configured with an MCS-spectral efficiency (SE) table for transmission uplink control messages that includes a set of SE values each associated with a respective MCS value, the data MCS indicator indicates that the uplink data channel may be associated with the second MCS which may be associated with a second SE value, a division between the second SE value and the MCS backoff value may be equal to a first SE value, and the second MCS may be associated with an SE value of the set of SE values that may be closet in value to the first SE value.

Some examples of the method, UEs, and non-transitory computer-readable medium described herein may further include operations, features, means, or instructions for receiving a second downlink control message that indicates for the UE to use MCS-SE table from a set of multiple MCS-SE tables configured at the UE for transmission of uplink control messages.

In some examples of the method, UEs, and non-transitory computer-readable medium described herein, the downlink control message may be a downlink control information (DCI) message that indicates the first MCS associated with the uplink control message and the second MCS associated with the uplink data channel.

Some examples of the method, UEs, and non-transitory computer-readable medium described herein may further include operations, features, means, or instructions for receiving, as part of the DCI message, an MCS backoff value associated with the second MCS, where, a first set of bits of the MCS backoff value indicates a scaling factor for a first SE value of the uplink control message relative a second SE value for the uplink data channel, a second set of bits of the MCS backoff value indicates the second modulation order, and the second MCS may be based on the first SE value and the second modulation order.

Some examples of the method, UEs, and non-transitory computer-readable medium described herein may further include operations, features, means, or instructions for receiving, as part of the DCI message, an uplink control MCS indicator indicating that the first MCS may be associated with the first modulation order and a first code rate and a data MCS indicator indicating that the second MCS may be associated with the second modulation order and a second code rate.

A method for wireless communications by a network entity is described. The method may include outputting, to a UE, a downlink control message indicating the UE to multiplex an uplink control message associated with a first MCS on an uplink data channel associated with a second MCS, where the first MCS has a first modulation order and the second MCS has a second modulation order that is different than the first modulation order and obtaining, via a wireless communications link between the network entity and the UE, a multiplexed uplink message including the uplink control message multiplexed with uplink data of the uplink data channel, where the uplink control message is associated with the first MCS on the uplink data channel associated with the second MCS.

A network entity for wireless communications is described. The network entity may include one or more memories storing processor executable code, and one or more processors coupled with the one or more memories. The one or more processors may individually or collectively be operable to execute the code to cause the network entity to output, to a UE, a downlink control message indicating the UE to multiplex an uplink control message associated with a first MCS on an uplink data channel associated with a second MCS, where the first MCS has a first modulation order and the second MCS has a second modulation order that is different than the first modulation order and obtain, via a wireless communications link between the network entity and the UE, a multiplexed uplink message including the uplink control message multiplexed with uplink data of the uplink data channel, where the uplink control message is associated with the first MCS on the uplink data channel associated with the second MCS.

Another network entity for wireless communications is described. The network entity may include means for outputting, to a UE, a downlink control message indicating the UE to multiplex an uplink control message associated with a first MCS on an uplink data channel associated with a second MCS, where the first MCS has a first modulation order and the second MCS has a second modulation order that is different than the first modulation order and means for obtaining, via a wireless communications link between the network entity and the UE, a multiplexed uplink message including the uplink control message multiplexed with uplink data of the uplink data channel, where the uplink control message is associated with the first MCS on the uplink data channel associated with the second MCS.

A non-transitory computer-readable medium storing code for wireless communications is described. The code may include instructions executable by one or more processors to output, to a UE, a downlink control message indicating the UE to multiplex an uplink control message associated with a first MCS on an uplink data channel associated with a second MCS, where the first MCS has a first modulation order and the second MCS has a second modulation order that is different than the first modulation order and obtain, via a wireless communications link between the network entity and the UE, a multiplexed uplink message including the uplink control message multiplexed with uplink data of the uplink data channel, where the uplink control message is associated with the first MCS on the uplink data channel associated with the second MCS.

Some examples of the method, network entities, and non-transitory computer-readable medium described herein may further include operations, features, means, or instructions for outputting, as part of the downlink control message, an indication of a data MCS indicator associated with the second MCS and an MCS backoff value, where the first MCS may be based on the data MCS indicator and the MCS backoff value.

In some examples of the method, network entities, and non-transitory computer-readable medium described herein, the UE may be configured with an MCS table including a set of indexes each associated with a respective MCS, the data MCS indicator indicates a second index from the set of indexes that may be associated with the second MCS, and a difference between the second index and the MCS backoff value may be equal to a first index of the set of indexes that may be associated with the first MCS.

Some examples of the method, network entities, and non-transitory computer-readable medium described herein may further include operations, features, means, or instructions for outputting a second downlink control message that configures the MCS table at the UE.

In some examples of the method, network entities, and non-transitory computer-readable medium described herein, the UE may be configured with an MCS-SE table for transmission uplink control messages that includes a set of SE values each associated with a respective MCS value, the data MCS indicator indicates that the uplink data channel may be associated with the second MCS which may be associated with a second SE value, a division between the second SE value and the MCS backoff value may be equal to a first SE value, and the second MCS may be associated with an SE value of the set of SE values that may be closet in value to the first SE value.

Some examples of the method, network entities, and non-transitory computer-readable medium described herein may further include operations, features, means, or instructions for outputting a second downlink control message that indicates for the UE to use MCS-SE table from a set of multiple MCS-SE tables configured at the UE for transmission of uplink control messages.

In some examples of the method, network entities, and non-transitory computer-readable medium described herein, the downlink control message may be a DCI message that indicates the first MCS associated with the uplink control message and the second MCS associated with the uplink data channel.

Some examples of the method, network entities, and non-transitory computer-readable medium described herein may further include operations, features, means, or instructions for outputting, as part of the DCI message, an MCS backoff value associated with the second MCS, where, a first set of bits of the MCS backoff value indicates a scaling factor for a first SE value of the uplink control message relative a second SE value for the uplink data channel, a second set of bits of the MCS backoff value indicates the second modulation order, and the second MCS may be based on the first SE value and the second modulation order.

Some examples of the method, network entities, and non-transitory computer-readable medium described herein may further include operations, features, means, or instructions for outputting, as part of the DCI message, an uplink control MCS indicator indicating that the first MCS may be associated with the first modulation order and a first code rate and a data MCS indicator indicating that the second MCS may be associated with the second modulation order and a second code rate.

DETAILED DESCRIPTION

Figure 1:
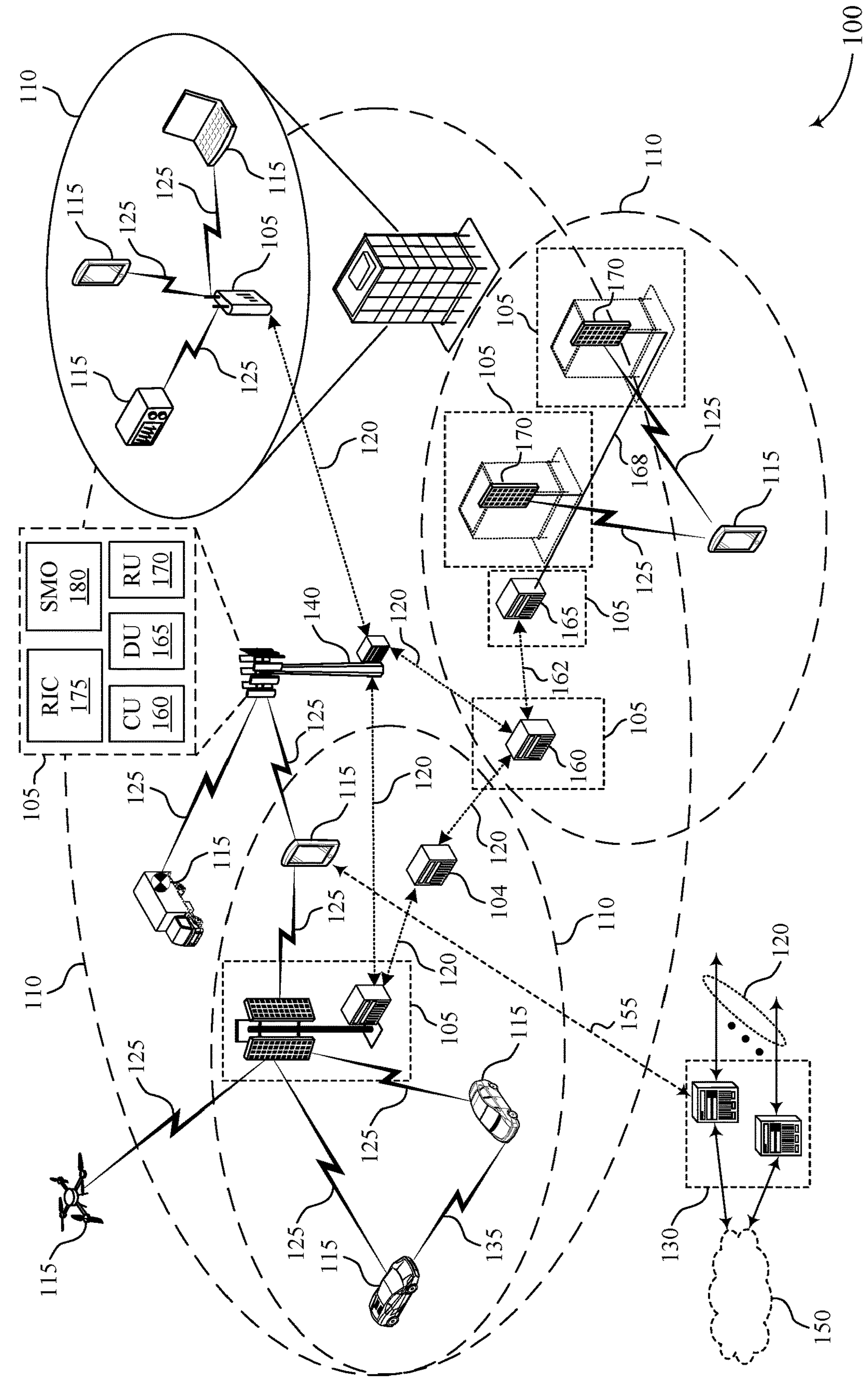
FIG. 1 shows an example of a wireless communications system that supports modulation rate control for multiplexing in accordance with one or more aspects of the present disclosure.

In some examples of wireless communications, a user equipment (UE) may communicate an uplink transmission in accordance with a modulation and coding scheme (MCS). For instance, an MCS may include a modulation order which refers to the quantity of bits represented by each symbol in the modulation scheme (binary phase shift keying (BPSK), quadrature phase shift keying (QPSK), 16 quadrature amplitude modulation (QAM), 64 QAM, 256 QAM, etc.) and a code rate which refers to the ratio of a quantity of information bits to the total quantity of bits transmitted (e.g., a measure of the efficiency of the error correction coding scheme used in the system). In some examples, different types of uplink transmissions may use different MCSs based on respective spectral efficiencies (SEs), where a given SE may be equal to the multiple of the modulation order and the code rate for a given MCS. In some examples, the UE may transmit data via a physical uplink shared channel (PUSCH) associated with a first SE that may be greater than a second SE associated with transmission of uplink control information (UCI). In some examples, the UE may determine to multiplex a UCI on a PUSCH, where the UE uses a same modulation order for both the UCI and the PUSCH in the multiplexed transmission. As such, the UE may use the scaling factor to calculate a code rate for the UCI such that the modulation order for the UCI is the same as the modulation for the PUSCH. In some cases, however, if the UE transmits a multiplex UCI using a high modulation order (e.g., above a threshold) and a low code rate (e.g., below a threshold), the multiplexed message may experience a decrease in transmission quality.

According to the techniques described herein, the UE may determine to transmit a multiplexed message that includes a UCI and data multiplexed on a PUSCH, where the UCI and PUSCH are associated with respective MCSs corresponding to different modulation orders. For instance, the network entity may transmit a downlink control message to the UE indicating for the UE to multiplex UCI associated with a first MCS on a PUSCH associated with a second MCS, where the first MCS has a first modulation order and the second MCS has a second modulation order that is different than the first modulation order.

In some cases, the UE may determine the first MCS (e.g., associated with the UCI) relative to the second MCS (e.g., associated with the PUSCH) based on an MCS backoff value. For instance, the UE may be configured with an MCS table, where each index of the MCS table is associated with a different MCS. In some examples, the UE may receive an indication of a data SE value associated with the PUSCH and an MCS backoff value, where a UCI SE value associated with the UCI is equal to the data SE value divided by the MCS backoff value. Additionally, the UE may be configured with a MCS-SE table for UCI transmissions, and may determine the first MCS for the UCI transmission based on calculating the UCI SE associated with the UCI.

In some cases, the UE may receive a dynamic downlink control information (DCI) signaling that indicates the first MCS and second MCS. In a first example, the UE may receive a first set of bits that indicates a scaling factor of the UCI SE for the UCI relative to a data SE for the PUSCH, and a second set of bits that indicates the first modulation order for the UCI. Based on the indication of the UCI SE and the first modulation order, the UE may determine the first MCS for the UCI. In a second example, the network entity may transmit a data MCS indicator that indicates the data MCS for the PUSCH and a UCI MCS indicator that indicates the UCI MCS for the UCI.

Aspects of the disclosure are initially described in the context of wireless communications systems. Aspects are also described in the context of UCI MCS determination procedures and a process flow. Aspects of the disclosure are further illustrated by and described with reference to apparatus diagrams, system diagrams, and flowcharts that relate to modulation rate control for multiplexing.

FIG. 1 shows an example of a wireless communications system 100 that supports modulation rate control for multiplexing in accordance with one or more aspects of the present disclosure. The wireless communications system 100 may include one or more devices, such as one or more network devices (e.g., network entities 105), one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via communication link(s) 125 (e.g., a radio frequency (RF) access link). For example, a network entity 105 may support a coverage area 110 (e.g., a geographic coverage area) over which the UEs 115 and the network entity 105 may establish the communication link(s) 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices in the wireless communications system 100 (e.g., other wireless communication devices, including UEs 115 or network entities 105), as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with a core network 130, or with one another, or both. For example, network entities 105 may communicate with the core network 130 via backhaul communication link(s) 120 (e.g., in accordance with an S1, N2, N3, or other interface protocol). In some examples, network entities 105 may communicate with one another via backhaul communication link(s) 120 (e.g., in accordance with an X2, Xn, or other interface protocol) either directly (e.g., directly between network entities 105) or indirectly (e.g., via the core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication link(s) 120, midhaul communication links 162, or fronthaul communication links 168 may be or include one or more wired links (e.g., an electrical link, an optical fiber link) or one or more wireless links (e.g., a radio link, a wireless optical link), among other examples or various combinations thereof. A UE 115 may communicate with the core network 130 via a communication link 155.

One or more of the network entities 105 or network equipment described herein may include or may be referred to as a base station 140 (e.g., a base transceiver station, a radio base station, an NR base station, an access point, a radio transceiver, a NodeB, an eNodeB (eNB), a next-generation NodeB or giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within one network entity (e.g., a network entity 105 or a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among multiple network entities (e.g., network entities 105), such as an integrated access and backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU), such as a CU 160, a distributed unit (DU), such as a DU 165, a radio unit (RU), such as an RU 170, a RAN Intelligent Controller (RIC), such as an RIC 175 (e.g., a Near-Real Time RIC (Near-RT RIC), a Non-Real Time RIC (Non-RT RIC)), a Service Management and Orchestration (SMO) system, such as an SMO system 180, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more of the network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, or any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaptation protocol (SDAP), Packet Data Convergence Protocol (PDCP)). The CU 160 (e.g., one or more CUs) may be connected to a DU 165 (e.g., one or more DUs) or an RU 170 (e.g., one or more RUs), or some combination thereof, and the DUs 165, RUs 170, or both may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or multiple different RUs, such as an RU 170). In some cases, a functional split between a CU 160 and a DU 165 or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to a DU 165 via a midhaul communication link 162 (e.g., F1, F1-c, F1-u), and a DU 165 may be connected to an RU 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities (e.g., one or more of the network entities 105) that are in communication via such communication links.

In some wireless communications systems (e.g., the wireless communications system 100), infrastructure and spectral resources for radio access may support wireless backhaul link capabilities to supplement wired backhaul connections, providing an IAB network architecture (e.g., to a core network 130). In some cases, in an IAB network, one or more of the network entities 105 (e.g., network entities 105 or IAB node(s) 104) may be partially controlled by each other. The IAB node(s) 104 may be referred to as a donor entity or an IAB donor. A DU 165 or an RU 170 may be partially controlled by a CU 160 associated with a network entity 105 or base station 140 (such as a donor network entity or a donor base station). The one or more donor entities (e.g., IAB donors) may be in communication with one or more additional devices (e.g., IAB node(s) 104) via supported access and backhaul links (e.g., backhaul communication link(s) 120). IAB node(s) 104 may include an IAB mobile termination (IAB-MT) controlled (e.g., scheduled) by one or more DUs (e.g., DUs 165) of a coupled IAB donor. An IAB-MT may be equipped with an independent set of antennas for relay of communications with UEs 115 or may share the same antennas (e.g., of an RU 170) of IAB node(s) 104 used for access via the DU 165 of the IAB node(s) 104 (e.g., referred to as virtual IAB-MT (vIAB-MT)). In some examples, the IAB node(s) 104 may include one or more DUs (e.g., DUs 165) that support communication links with additional entities (e.g., IAB node(s) 104, UEs 115) within the relay chain or configuration of the access network (e.g., downstream). In such cases, one or more components of the disaggregated RAN architecture (e.g., the IAB node(s) 104 or components of the IAB node(s) 104) may be configured to operate according to the techniques described herein.

For instance, an access network (AN) or RAN may include communications between access nodes (e.g., an IAB donor), IAB node(s) 104, and one or more UEs 115. The IAB donor may facilitate connection between the core network 130 and the AN (e.g., via a wired or wireless connection to the core network 130). That is, an IAB donor may refer to a RAN node with a wired or wireless connection to the core network 130. The IAB donor may include one or more of a CU 160, a DU 165, and an RU 170, in which case the CU 160 may communicate with the core network 130 via an interface (e.g., a backhaul link). The IAB donor and IAB node(s) 104 may communicate via an F1 interface according to a protocol that defines signaling messages (e.g., an F1 AP protocol). Additionally, or alternatively, the CU 160 may communicate with the core network 130 via an interface, which may be an example of a portion of a backhaul link, and may communicate with other CUs (e.g., including a CU 160 associated with an alternative IAB donor) via an Xn-C interface, which may be an example of another portion of a backhaul link.

IAB node(s) 104 may refer to RAN nodes that provide IAB functionality (e.g., access for UEs 115, wireless self-backhauling capabilities). A DU 165 may act as a distributed scheduling node towards child nodes associated with the IAB node(s) 104, and the IAB-MT may act as a scheduled node towards parent nodes associated with IAB node(s) 104. That is, an IAB donor may be referred to as a parent node in communication with one or more child nodes (e.g., an IAB donor may relay transmissions for UEs through other IAB node(s) 104). Additionally, or alternatively, IAB node(s) 104 may also be referred to as parent nodes or child nodes to other IAB node(s) 104, depending on the relay chain or configuration of the AN. The IAB-MT entity of IAB node(s) 104 may provide a Uu interface for a child IAB node (e.g., the IAB node(s) 104) to receive signaling from a parent IAB node (e.g., the IAB node(s) 104), and a DU interface (e.g., a DU 165) may provide a Uu interface for a parent IAB node to signal to a child IAB node or UE 115.

For example, IAB node(s) 104 may be referred to as parent nodes that support communications for child IAB nodes, or may be referred to as child IAB nodes associated with IAB donors, or both. An IAB donor may include a CU 160 with a wired or wireless connection (e.g., backhaul communication link(s) 120) to the core network 130 and may act as a parent node to IAB node(s) 104. For example, the DU 165 of an IAB donor may relay transmissions to UEs 115 through IAB node(s) 104, or may directly signal transmissions to a UE 115, or both. The CU 160 of the IAB donor may signal communication link establishment via an F1 interface to IAB node(s) 104, and the IAB node(s) 104 may schedule transmissions (e.g., transmissions to the UEs 115 relayed from the IAB donor) through one or more DUs (e.g., DUs 165). That is, data may be relayed to and from IAB node(s) 104 via signaling via an NR Uu interface to MT of IAB node(s) 104 (e.g., other IAB node(s)). Communications with IAB node(s) 104 may be scheduled by a DU 165 of the IAB donor or of IAB node(s) 104.

In the case of the techniques described herein applied in the context of a disaggregated RAN architecture, one or more components of the disaggregated RAN architecture may be configured to support test as described herein. For example, some operations described as being performed by a UE 115 or a network entity 105 (e.g., a base station 140) may additionally, or alternatively, be performed by one or more components of the disaggregated RAN architecture (e.g., components such as an IAB node, a DU 165, a CU 160, an RU 170, an RIC 175, an SMO system 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or meters, among other examples.

The UEs 115 described herein may be able to communicate with various types of devices, such as UEs 115 that may sometimes operate as relays, as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via the communication link(s) 125 (e.g., one or more access links) using resources associated with one or more carriers. The term "carrier" may refer to a set of RF spectrum resources having a defined PHY layer structure for supporting the communication link(s) 125. For example, a carrier used for the communication link(s) 125 may include a portion of an RF spectrum band (e.g., a bandwidth part (BWP)) that is operated according to one or more PHY layer channels for a given RAT (e.g., LTE, LTE-A, LTE-A Pro, NR). Each PHY layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities, such as one or more of the network entities 105).

In some examples, such as in a carrier aggregation configuration, a carrier may have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different RAT).

The communication link(s) 125 of the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular RAT (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max}\cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems, such as the wireless communications system 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to UEs 115 (e.g., one or more UEs) or may include UE-specific search space sets for sending control information to a UE 115 (e.g., a specific UE).

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID)). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a network entity 105 operating with lower power (e.g., a base station 140 operating with lower power) relative to a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or more cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area, such as the coverage area 110. In some examples, coverage areas 110 (e.g., different coverage areas) associated with different technologies may overlap, but the coverage areas 110 (e.g., different coverage areas) may be supported by the same network entity (e.g., a network entity 105). In some other examples, overlapping coverage areas, such as a coverage area 110, associated with different technologies may be supported by different network entities (e.g., the network entities 105). The wireless communications system 100 may include, for example, a heterogeneous network in which different types of the network entities 105 support communications for coverage areas 110 (e.g., different coverage areas) using the same or different RATs.

The wireless communications system 100 may support synchronous or asynchronous operation. For synchronous operation, network entities 105 (e.g., base stations 140) may have similar frame timings, and transmissions from different network entities (e.g., different ones of the network entities 105) may be approximately aligned in time. For asynchronous operation, network entities 105 may have different frame timings, and transmissions from different network entities (e.g., different ones of network entities 105) may, in some examples, not be aligned in time. The techniques described herein may be used for either synchronous or asynchronous operations.

Some UEs 115, such as MTC or IoT devices, may be relatively low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 may include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs (e.g., one or more of the UEs 115) via a device-to-device (D2D) communication link, such as a D2D communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to one or more of the UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than one hundred kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) RAT, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency (SE) by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by a transmitting device (e.g., a network entity 105 or a UE 115) along a single beam direction (e.g., a direction associated with the receiving device, such as another network entity 105 or UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a transmitting device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., the communication link(s) 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in relatively poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In wireless communications system 100, a UE 115 may transmit an uplink message using an MCS. In some cases, different types of uplink messages may use different MCSs based on respective SEs. For instance, a UE 115 may transmit data via a PUSCH associated with a first SE that may be greater than a second SE associated with UCI. In some examples, a UE 115 may determine to transmit a multiplexed message that includes a UCI and data multiplexed on a PUSCH, where the UCI and PUSCH are associated with respective MCSs corresponding to different modulation orders. For instance, the UE 115 may determine the first MCS (e.g., associated with the UCI) relative to the second MCS (e.g., associated with the PUSCH) based on an MCS backoff value. In some cases, the UE 115 may be configured with an MCS table, where each index of the MCS table is associated with a different MCS or the UE 115 may receive, from network entity 105, an indication of a data SE value associated with the PUSCH and an MCS backoff value, where a UCI SE value associated with the UCI is equal to the data SE value divided by the MCS backoff value. Further, a UE 115 may receive a dynamic DCI signaling that indicates the first MCS and second MCS.

Figure 2:
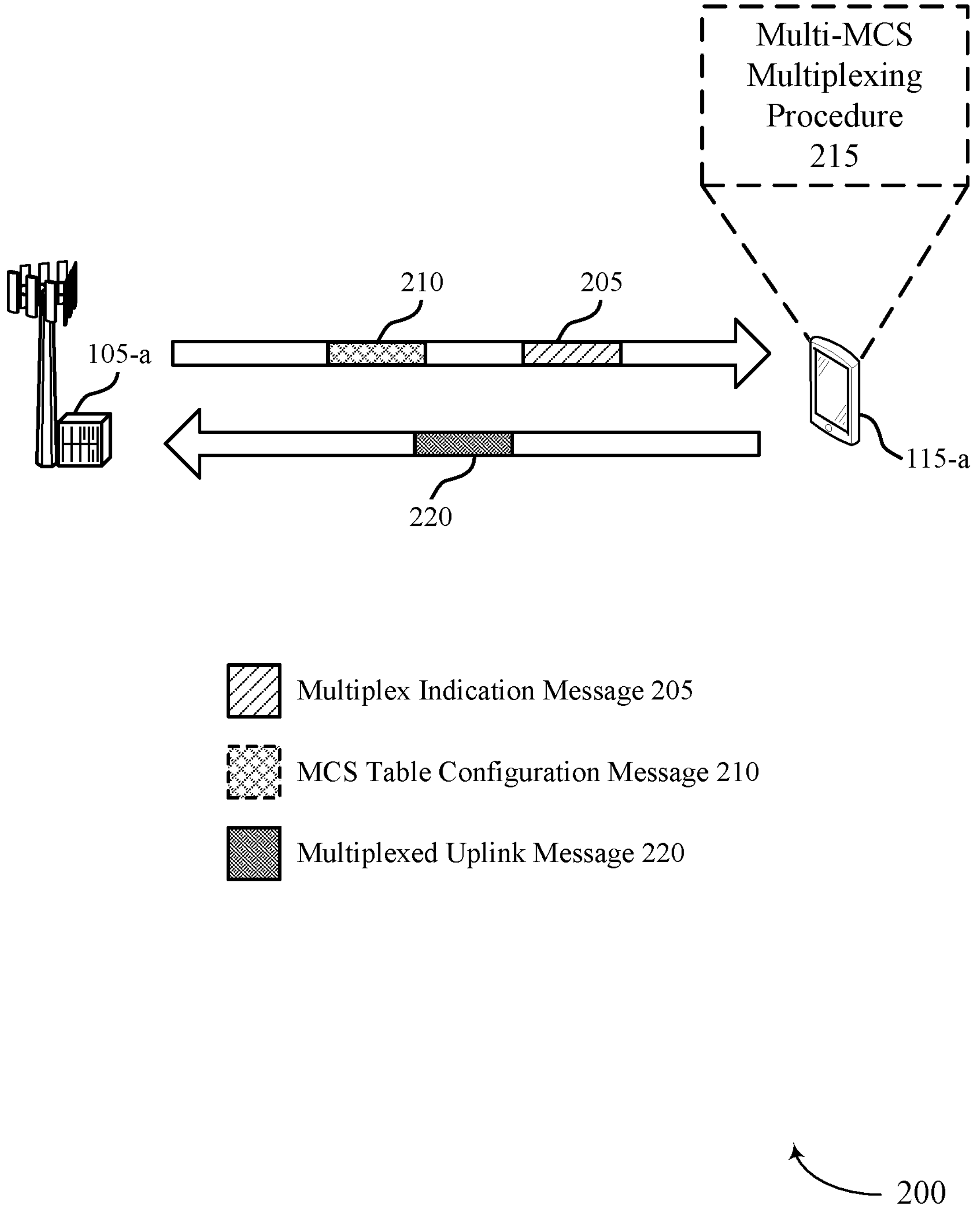
FIG. 2 shows an example of a wireless communications system that supports modulation rate control for multiplexing in accordance with one or more aspects of the present disclosure.

FIG. 2 shows an example of a wireless communications system 200 that supports modulation rate control for multiplexing in accordance with one or more aspects of the present disclosure. The wireless communications system 200 may implement or may be implemented by aspects of the wireless communications system 100. For example, the wireless communications system 200 may include a UE 115-*a*, which may be an example of a UE 115 as described herein. The wireless communications system 200 may include a network entity 105-*a*, which may be an example of a network entity 105 as described herein.

In some examples of wireless communications system 200, the UE 115-*a* may communicate an uplink transmission in accordance with one or more MCSs. For instance, an MCS may include a modulation order and a code rate. In some examples, the modulation order may be associated with the quantity of bits that the UE 115-*a* may encode per time symbol in a modulation scheme. For instance, a BPSK modulation order may encode one bit per symbol, a QPSK modulation order may encode two bits per symbol, a 16-QAM modulation order may encode four bits per symbol, a 64-QAM modulation order may encode eight bits per symbol, and a 256-QAM modulation order may encode 16 bits per symbol. Additionally, it is understood that the modulation order examples provided herein are not an exhaustive list, such that the UE 115-*a* and network entity 105-*a* may each operate in accordance with any quantity of different types of modulation orders. In some examples, the code rate may be associated with the ratio of a quantity of information bits to the total quantity of bits transmitted (e.g., including both information and redundancy bits). Higher code rates may provide an increase in error correction capabilities which may be associated with higher signal-to-noise ratios (SNRs) to maintain reliable communication.

In some examples, an MCS used for a given uplink transmission may be associated with an SE for a frequency channel the UE 115-*a* uses for the given uplink transmission. For instance, SE in wireless communications may refer to the quantity of data that can be reliably transmitted over a given bandwidth in a specific radio channel. As such, the UE 115-*a* and network entity 105-*a* may use SE as a metric for assessing the efficiency and performance of the wireless communications system 200. In some examples, the UE 115-*a* and network entity 105-*a* may calculate the SE as the product of the modulation order and the code rate for a given transmission (e.g., SE is associated with units of bits/s/Hz).

In some cases, the UE 115-*a* may use different MCSs associated with different spectrum efficiencies based on the type of uplink transmission the UE 115-*a* performs. For example, if the UE 115-*a* transmits a UCI message using a PUCCH (e.g., the UCI is the payload of the PUCCH) the UE 115-*a* may use a first SE, and if the UE 115-*a* transmits a data message using a PUSCH (e.g., the data is the payload of the PUSCH) the UE 115-*a* may use a second SE. In some examples, the second efficiency associated with the PUSCH may be greater than the first SE associated with the UCI. Additionally, or alternatively, the UE 115-*a* may determine to perform multiplexing techniques to concurrently transmits a UCI message and a data message. For example, the UE 115-*a* may perform orthogonal frequency division multiplexing (OFDM) in which the UE 115-*a* may drop the PUCCH and include both the contents of the UCI message and the data message on the PUSCH.

In some cases of multiplexing, the UE 115-*a* may determine to use a same modulation order for the multiplexed transmission of the UCI message and the data message on the PUSCH. As such, to account for the difference in spectrum efficiencies between the UCI message and the data message, the UE 115-*a* may use a scaling factor to determine the code rate of the UCI message relative to the code rate of the data message. In one example, the data message has an SE of 4 bits/s/Hz and the UCI message has SE of 0.5 bits/s/Hz, such that the scaling factor of the SE between the data message and the UCI message is eight. As such, if the data message is associated with a modulation order of 256-QAM and code rate of ½, then the UE 115-*a* may determine to use the same modulation order (e.g., 256-QAM) and determine a code rate of 1/16 for the UCI message (e.g., ⅛ of the code rate used for the data message). In some cases, however, if the UE 115-*a* transmits a given message with a high modulation order (e.g., above a threshold) relative a low code rate (e.g., below a threshold), the wireless communications system 200 may experience a decrease in transmission quality. Such reductions in transmission quality may result in dropped signals, which may increase signal retransmission, signal overhead, and processing power at the UE 115-*a* and network entity 105-*a*.

As such, the network entity 105-*a* and the UE 115-*a* may increase the signal quality of multiplexed communications by operating in accordance with the techniques described herein. For example, the network entity 105-*a* may transmit to the UE 115-*a* a multiplex indication message 205 indicating for the UE 115-*a* to multiplex a UCI message on a PUSCH, where the UCI message may use a first modulation order that is different than a second modulation order associated with the PUSCH (e.g., rather than maintaining a same modulation order for the UCI message and the PUSCH).

In some examples, the multiplex indication message 205 may include a data MCS indicator associated with a data MCS (e.g., used for the PUSCH) and an MCS backoff value. In such examples the UE 115-*a* may determine a UCI MCS (e.g., used for the UCI) based on the data MCS and the MCS backoff value.

In a first example, the MCS backoff value may be an integer value associated with index values of an MCS table, where the MCS table may be configured at the UE 115-*a*. For instance, the data MCS may be associated with a first index of the MCS table and the multiplex indication message 205 may indicate for the UE 115-*a* to select the UCI MCS as a given MCS from the MCS table associated with a second index value, where the second index value is the difference of the first index and the MCS backoff value. Further discussion of the MCS backoff value indicating an index backoff value relative to a configured MCS table is described herein, including with reference to FIG. 3A.

In a second example, the MCS backoff value may be scaling factor indicating a decrease in SE of the UCI message relative to the SE of the PUSCH. For instance, the data MCS may be associated with a first SE such that the UE 115-*a* may determine a second SE associated with the UCI. As such, the UE 115-*a* may use the second SE in accordance with an MCS-SE table to determine a modulation order and code rate that corresponds to the second SE. Further discussion of the MCS backoff value indicating a scaling factor value relative to an SE of a PUSCH is described herein, including with reference to FIG. 3B.

Additionally or alternatively, the MCS tables described herein may be configured at the UE 115-*a* by the network entity 105-*a*. For example, the network entity 105-*a* may transmit an MCS table configuration message 210 (e.g., as part of a downlink control information (DCI), a MAC control element (MAC-CE), or an RRC) which may configure one or more of the MCS tables. Further discussion of MCS table configuration is described herein, including with reference to FIGS. 3A and 3B.

In some examples, the multiplex indication message 205 may directly indicate the modulation order associated with the UCI MCS (e.g., via a DCI). In a first example of direct indication, the multiple indication message 205 (e.g., a DCI) may include a set of bits. In such a first example, a first portion of the bits (e.g., a first two bits) may indicate a scaling factor of the UCI SE with reference to the data SE, and a second portion of bits (e.g., a second two bits) may indicate the modulation order used for the UCI, where the modulation order for the UCI may be different than the data modulation order of the PUSCH. As such, each respective value of the second portion of bits may be associated with a respective modulation order.

In a second example of direct indication, the multiplex indication message 205 may directly indicate the data MCS and the UCI MCS. In such a second example, the multiple indication message 205 (e.g., a DCI) may include a data MCS indicator which indicates a data modulation order and a data code rate and may include a UCI MCS indicator which may include a UCI modulation order and a UCI code rate. As such, the UCI modulation order and the data modulation order may be different, in accordance with the techniques described herein.

Based on receiving the multiplex indication message 205, the UE 115-*a* may perform a multi-MCS multiplexing procedure 215. For example, the UE 115-*a* may multiplex the UCI message associated with the MCS UCI with the PUSCH associated with the data MCS. As such, and in accordance with the multi-MCS multiplexing procedure 215, the UE 115-*a* may generate a multiplexed uplink message 220, that includes the UCI message multiplexed with uplink data of the PUSCH. In response to generating, the UE 115-*a* may transmit the multiplexed uplink message 220 to the network entity 105-*a*. For example, the UE 115-*a* may transmit the multiplexed uplink message 220 via a wireless communications link between the UE 115-*a* and the network entity 105-*a*. In some examples, the wireless communication link may be a Uu link used for uplink and downlink communications between the UE 115-*a* and a network. Additionally, or alternatively, while the techniques described herein discuss a UE 115-*a* multiplexing a UCI on a PUSCH using respective modulation orders, it is understood that such techniques may be implemented by the network entity 105-*a* in accordance with downlink transmissions. That is, the network entity 105-*a* may perform said techniques in accordance with multiplexing a DCI message on a physical downlink shared channel (PDSCH).

Figure 3A:
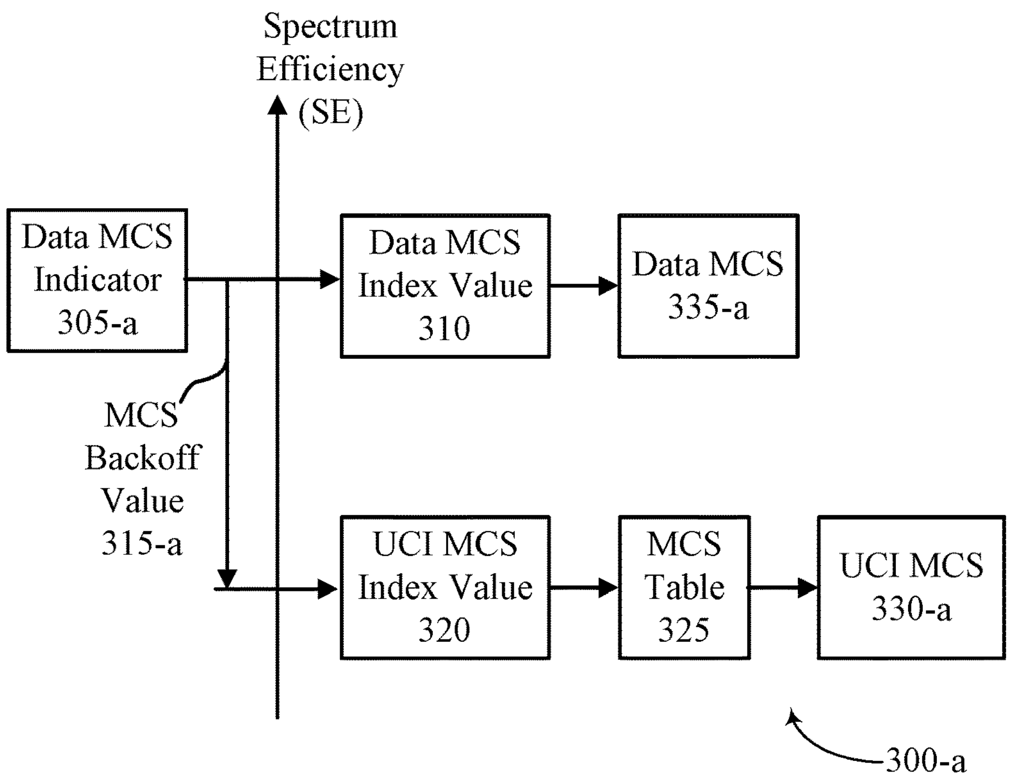
FIGS. 3A and 3B show examples of an uplink control information (UCI) modulation and coding scheme (MCS) determination procedure that supports modulation rate control for multiplexing in accordance with one or more aspects of the present disclosure.
Figure 3B:
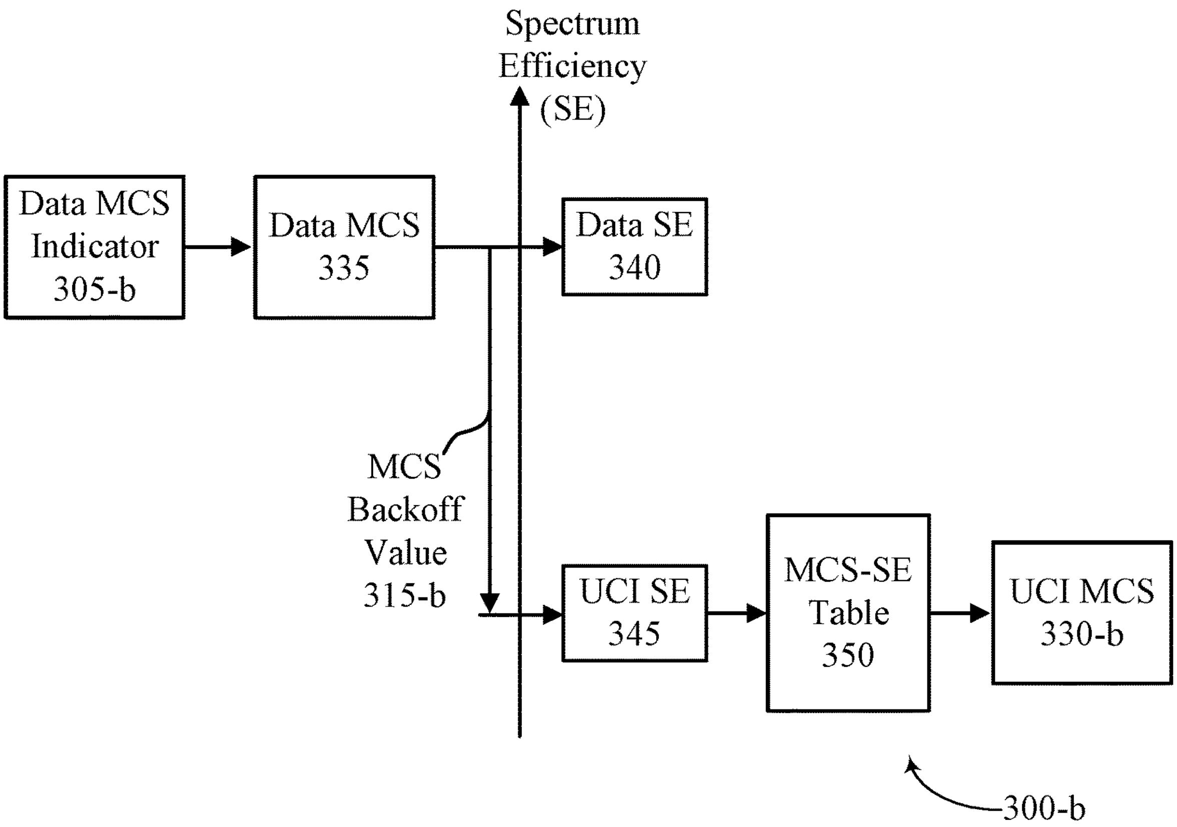

FIGS. 3A and 3B each show a respective example of a UCI MCS determination procedure 300 that supports modulation rate control for multiplexing in accordance with one or more aspects of the present disclosure. Each of UCI MCS determination procedure 300-*a* and 300-*b* may implement or may be implemented by aspects of the wireless communications system 100 and 200. For example, the UE 115 may perform one or more operations as depicted in FIGS. 3A and 3B in accordance with receiving one or more control messages from a network entity 105, where the UE 115 and network entity 105 are examples of respective devices described with reference to FIGS. 1 and 2.

As illustrated in FIG. 3A, the UE 115 may receive from the network entity 105 a data MCS indicator 305-*a*. In some examples, the data MCS indicator 305-*a* may indicate a data modulation order and a data code rate associated with a PUSCH scheduled for the UE 115. For instance, the data MCS indicator 305-*a* may be a data MCS index value 310 associated with an MCS table 325 configured at the UE 115. The MCS table 325 may be table that includes a respective set of modulation orders and code rates each associated with a respective index of the MCS table 325. That is, each index value of the MCS table 325 may be associated with a respective MCS (e.g., a respective modulation order and a respective code rate). As such, the data MCS index value 310 may be a first index value of the MCS table 325 (e.g., value X) which indicates a data MCS 335-*a* associated with the scheduled PUSCH.

Additionally, the UE 115 may receive from the network entity 105 an MCS backoff value 315-*a* (e.g., beta). In some examples, the MCS backoff value 315-*a* may be integer value associated with the indexes of the MCS table 325 configured at the UE 115. Based on receiving the MCS backoff value 315-*a*, the UE 115 may determine a UCI MCS index value 320. For example, the UE 115 may determine the UCI MCS index value as a difference between the data MCS index value 310 and the MCS backoff value 315-*a* (e.g., X-beta). For instance, if the data MCS index value 310 is a value of 15 and the MCS backoff value 315-*a* is a value of 3, the UE 115 may determine the UCI MCS index value 320 as a value of 12. As such, the UE 115 may determine the UCI MCS 330-*a* as the respective modulation order and code rate of the MCS table 325 that is associated with the determined UCI MCS index value 320.

As described herein, the UE 115 may use the MCS table 325 to determine the data MCS 335-*a* and the UCI MCS 330-*a*, where a first modulation order associated with the data MCS 335-*a* may be different than a second modulation order associated with the UCI MCS 330-*a*. As illustrated in FIG. 3A, a first spectrum efficiency associated with data MCS 335-*a* may be greater than a second spectrum efficiency associated with UCI MCS 330-*a* in accordance with applying the MCS backoff value 315-*a*. As such, the second modulation order associated with the UCI MCS 330-*a* may be a lower modulation order compared to the first modulation order of the data MCS 335-*a*. In one example, the first modulation of the data MCS 335-*a* may be 16 QAM and the second modulation order of the UCI MCS 330-*a* may be QPSK.

To perform multiplexing of the UCI on the PUSCH using different modulation orders, the UE 115 may nest a first modulation constellation associated with the first modulation order into a second modulation constellation of the second modulation order. For instance, the UE 115 may nest a QPSK constellation within a 16 QAM by allocating four constellation points of the 16 QAM constellation for QPSK. In some examples, the UE 115 may allocate the outer most points of the second modulation constellation for the first modulation constellation (e.g., the constellation points associated with the highest amplitude). As such, the UE 115 may transmit a multiplexed message where the UCI portion of the multiplexed message may be transmitted at a higher power compared to a data portion of the multiplexed message.

Additionally, or alternatively, the PUSCH used for the multiplexed message may be associated with a set of time and frequency resource blocks. Based on transmitting the UCI at a higher power compared to the data, the UE 115 may refrain from transmitting the UCI information using resource blocks at either edge of the frequency bandwidth of the PUSCH. Additionally, or alternatively, the UE 115 may use a comb-based resource element mapping for transmission of the UCI information, where the UE 115 may alternate between resource elements including UCI information and resource elements that do not include UCI information (e.g., non-contiguous resource elements in the frequency domain).

Additionally, or alternatively, the network entity 105 may determine to handle two different power levels for receiving a data OFDM symbol that includes the multiplexed message (e.g., a first power level associated with the UCI and a second power level associated with the data). Additionally, or alternatively, the network entity 105 may perform log likelihood ratio (LLR) cancellation when receiving and decoding the multiplexed message. For example, the network entity 105 may zero out the LLR for unused constellation points of resources elements associated with the UCI. By operating in accordance with the techniques described herein, the UE 115 and the network entity 105 may account for different modulation orders associated with transmission of UCI and data in a same multiplexed uplink message.

As illustrated in FIG. 3B, the UE 115 may receive from the network entity 105 a data MCS indicator 305-*b*. In some examples, the data MCS indicator 305-*b* may indicate or point to a data MCS 335-*b* that is associated with a data modulation order and a data code rate for with a PUSCH scheduled for the UE 115. As illustrated in FIG. 3B, the data MCS 335-*b* may be associated with a first data SE 340. For instance, the data SE 340 may be equal to the data modulation order multiplied by the data code rate. As such, the data SE 340 may be associated with a first SE value (e.g., value X) which is associated the data MCS 335-*b* associated with the scheduled PUSCH.

Additionally, the UE 115 may receive from the network entity 105 an MCS backoff value 315-*b* (e.g., beta). In some examples, the MCS backoff value 315-*b* may be value that relates the data SE 340 to a UCI SE 345. For instance, the UE 115 may determine the UCI SE 345 as the data SE 340 divided by the MCS backoff value 315-*b* (e.g., X/beta). In some cases, the MCS backoff value 315-*b* may be any positive integer value or any positive real number value.

Based on determining the UCI SE 345, the UE 115 may determine a UCI MCS 330-*b* in accordance with an MCS-SE table 350. For instance, the MCS-SE table 350 may include a respective set of SE values each associated with a respective modulation order and a respective code rate. As such, the UE 115 may use the UCI SE 345 to select (e.g., determine) which respective modulation order and code rate from the MCS-SE table 350 to use for the UCI MCS 330-*b*. For instance, the UE 115 may determine which given SE included in the MCS-SE table 350 is closet in value to the UCI SE 345 and select the modulation order and code rate associated with said given SE from the MCS-SE table 350. As such, the UE 115 may determine the UCI MCS 330-*b* based on the data MCS 335-*b* and the MCS backoff value 315-*b*.

Additionally, or alternatively, the network entity 105 may configure the UE 115 with multiple respective MCS-SE tables 350. In some examples, each respective MCS-SE table 350 may be associated with a different modulation order used between the data MCS 335-*b* and the UCI MCS 330-*b*, where the modulation orders included in a given MCS-SE table 350 may be based on the greatest modulation order between data MCS 335-*b* and the UCI MCS 330-*b*. For instance, a first MCS-SE table 350 may be a based on a QPSK modulation order (e.g., including different spectral efficiencies associated with QPSK and BPSK). A second MCS-SE table 350 may be a based on a 16 QAM modulation order (e.g., including different spectral efficiencies associated with 16 QAM, QPSK, and BPSK). A third MCS-SE table 350 may be a based on a 64 QAM modulation order (e.g., including different spectral efficiencies associated with 64 QAM, 16 QAM, QPSK, and BPSK). Additionally, or alternatively, a fourth MCS-SE table 350 may be a fallback MCS-SE table 350 that indicates foe the UE 115 to use a same modulation order for the data MCS 335-*b* and the UCI MCS 330-*b*.

In some cases, the network entity 105 may configure the UE 115 with the different MCS-SE tables 350 using one or more control messages (e.g., RRC, DCI, MAC-CE, or a combination thereof). As such, the network entity 105 may dynamically indicate which MCS-SE table 350 via the multiplex indication message 205 (e.g., with reference to FIG. 2), or a separate RRC message. For instance, if the data MCS is associated with the 16 QAM modulation order, the network entity 105 may indicate for the UE 115 to use the second MCS-SE table 350 for generating the multiplexed uplink message that includes the UCI and the data on the PUSCH.

Figure 4:
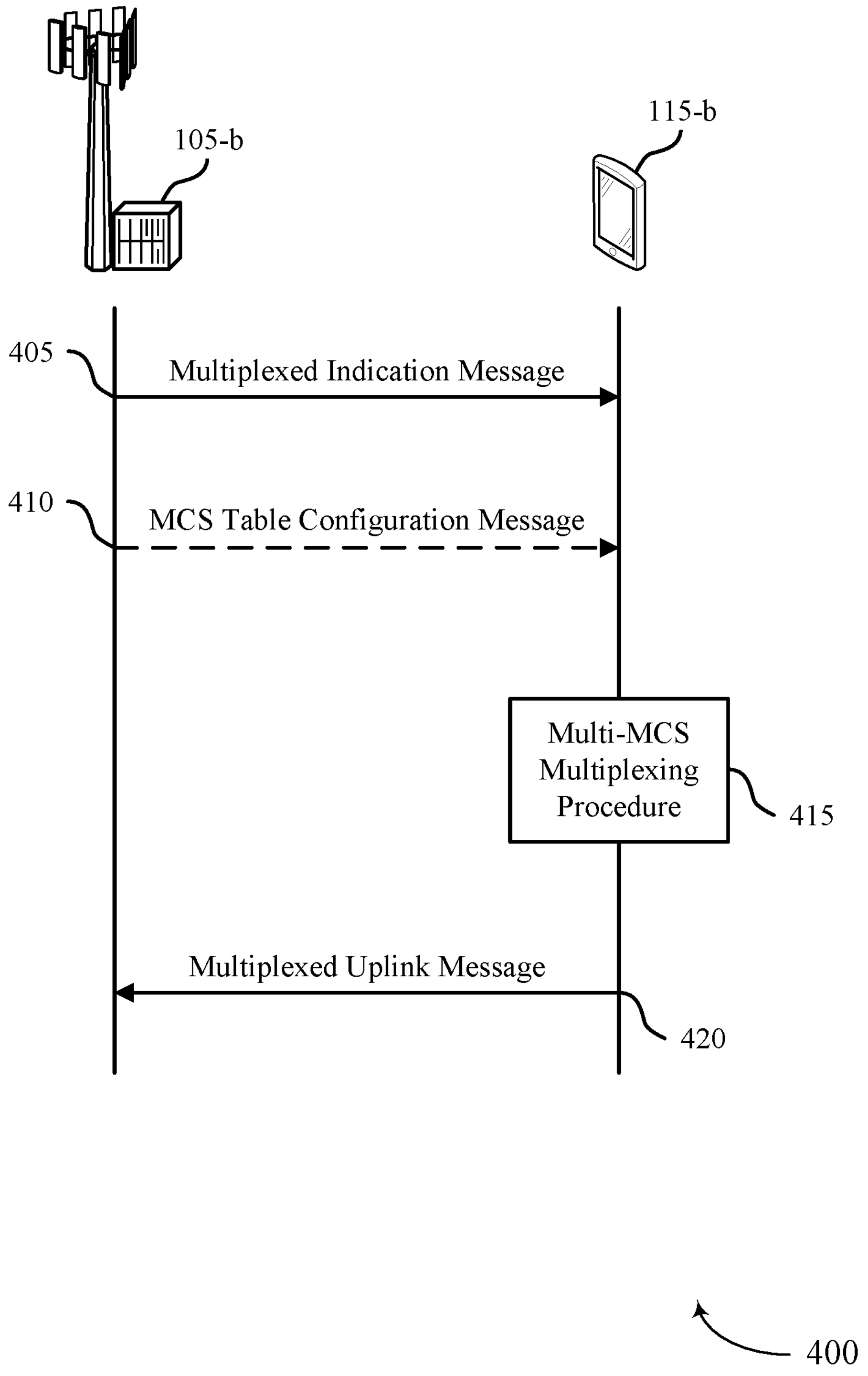
FIG. 4 shows an example of a process flow that supports modulation rate control for multiplexing in accordance with one or more aspects of the present disclosure.

FIG. 4 shows an example of a process flow 400 that supports modulation rate control for multiplexing in accordance with one or more aspects of the present disclosure. In some examples, process flow 400 may implement aspects of wireless communications system 100, wireless communications system 200, and UCI MCS determination procedure 300-*a* and 300-*b*. Process flow 400 may include a UE 115-*b* and a network entity 105-*b*, as described with reference to FIGS. 1 through 3. Alternative examples of the following may be implemented, where some steps are performed in a different order than described or are not performed at all. In some cases, steps may include additional features not mentioned below, or further steps may be added. In addition, it is understood that these processes may occur between any quantity of network devices and network device types.

At 405, the UE 115-*b* may receive from the network entity 105-*b* a downlink control message indicating the UE 115-*b* to multiplex an UCI message associated with a first MCS on a PUSCH associated with a second MCS. In some examples, the first MCS has a first modulation order and the second MCS has a second modulation order that is different than the first modulation order.

In some examples, the UE 115-*b* may receive as part of the downlink control message, an indication of a data MCS indicator associated with the second MCS and an MCS backoff value, where the first MCS is based on the data MCS indicator and the MCS backoff value. In a first example, the UE 115-*b* may be configured with an MCS table that includes a set of indexes each associated with a respective MCS (e.g., MCS table 325, with reference to FIG. 3A). In such a first example, the data MCS indicator may indicate a second index from the set of indexes that is associated with the second MCS, and a difference between the second index and the MCS backoff value that is equal to a first index of the set of indexes that is associated with the first MCS.

In a second example, the UE 115-*b* may be configured with an MCS-SE table for transmission UCI messages that comprises a set of SE values each associated with a respective MCS value (e.g., MCS-SE table 350, with reference to FIG. 3B). In such a second example, the data MCS indicator may indicate that the PUSCH is associated with the second MCS which is associated with a second SE value, a division between the second SE value and the MCS backoff value is equal to a first SE value, and that the second MCS is associated with an SE value of the set of SE values that is closet in value to the first SE value.

In some examples, the downlink control message may be a DCI message that indicates the first MCS is associated with the UCI message and the second MCS is associated with the PUSCH. In a first example, the UE 115-*b* may receive, as part of the DCI message, an MCS backoff value associated with the second MCS. In such a first example, a first set of bits of the MCS backoff value may indicate a scaling factor for a first SE value of the UCI message relative a second SE value for the PUSCH, a second set of bits of the MCS backoff value may indicate the second modulation order, and the second MCS may be based on the first SE value and the second modulation order. In a second example, the UE 115-*b* may receive as part of the DCI message, an UCI MCS indicator indicating that the first MCS is associated with the first modulation order and a first code rate and a data MCS indicator indicating that the second MCS is associated with the second modulation order and a second code rate.

At 410, the UE 115-*b* may optionally receive one or more MCS table configuration messages (e.g., MCS table configuration message 210, with reference to FIG. 2). In some examples, the UE 115-*b* may receive a second downlink control message that configures the MCS table at the UE 115-*b*. Additionally or alternatively, the UE 115-*b* may receive a third downlink control message that indicates for the UE 115-*b* to use MCS-SE table from a set of MCS-SE tables configured at the UE 115-*b* for transmission of UCI messages.

At 415, the UE 115-*b* may perform a multi-MCS multiplexing procedure (e.g., multi-MCS multiplexing procedure 215, with reference to FIG. 2). For example, the UE 115-*b* may multiplex, based on the downlink control message, the UCI message associated with the first MCS on the PUSCH associated with the second MCS to generate a multiplexed uplink message that includes the UCI message multiplexed with uplink data of the PUSCH.

At 420, the UE 115-*b* may transmit the multiplexed uplink message. For example, the UE 115-*b* may transmit, via a wireless communications link between the network entity 105-*b* and the UE 115-*b*, the multiplexed uplink message.

Figure 5:
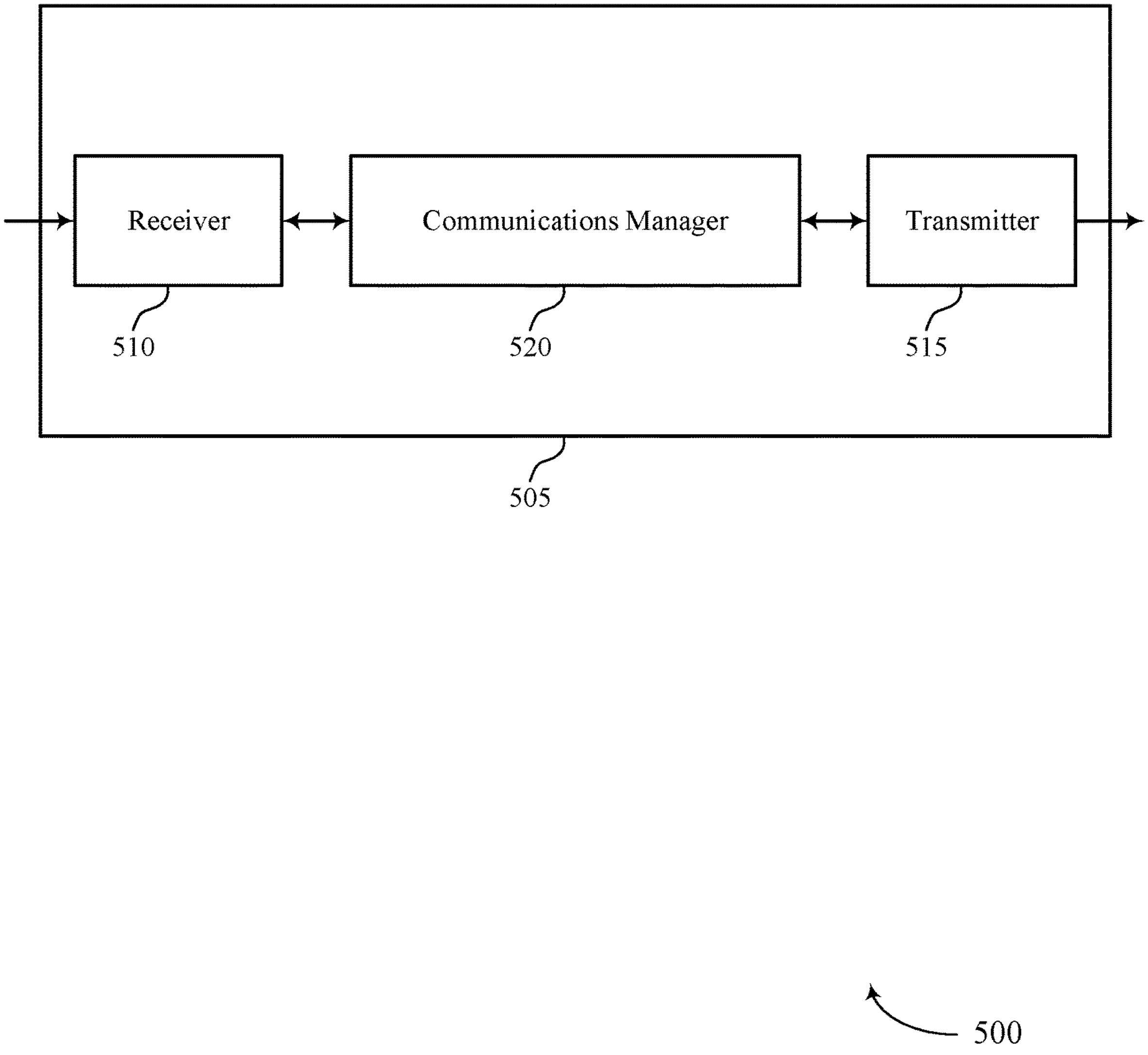
FIGS. 5 and 6 show block diagrams of devices that support modulation rate control for multiplexing in accordance with one or more aspects of the present disclosure.

FIG. 5 shows a block diagram 500 of a device 505 that supports modulation rate control for multiplexing in accordance with one or more aspects of the present disclosure. The device 505 may be an example of aspects of a UE 115 as described herein. The device 505 may include a receiver 510, a transmitter 515, and a communications manager 520. The device 505, or one or more components of the device 505 (e.g., the receiver 510, the transmitter 515, the communications manager 520), may include at least one processor, which may be coupled with at least one memory, to, individually or collectively, support or enable the described techniques. Each of these components may be in communication with one another (e.g., via one or more buses).

The receiver 510 may provide a means for receiving information such as packets, user data, control information, or any combination thereof associated with various information channels (e.g., control channels, data channels, information channels related to modulation rate control for multiplexing). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to modulation rate control for multiplexing). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations or components thereof may be examples of means for performing various aspects of modulation rate control for multiplexing as described herein. For example, the communications manager 520, the receiver 510, the transmitter 515, or various combinations or components thereof may be capable of performing one or more of the functions described herein.

In some examples, the communications manager 520, the receiver 510, the transmitter 515, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 520, the receiver 510, the transmitter 515, or various combinations or components thereof may be implemented in code (e.g., as communications management software or firmware) executed by at least one processor (e.g., referred to as a processor-executable code). If implemented in code executed by at least one processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications in accordance with examples as disclosed herein. For example, the communications manager 520 is capable of, configured to, or operable to support a means for receiving, from a network entity, a downlink control message indicating the UE to multiplex an uplink control message associated with a first MCS on an uplink data channel associated with a second MCS, where the first MCS has a first modulation order and the second MCS has a second modulation order that is different than the first modulation order. The communications manager 520 is capable of, configured to, or operable to support a means for multiplexing, basing at least in part on the downlink control message, the uplink control message associated with the first MCS on the uplink data channel associated with the second MCS to generate a multiplexed uplink message including the uplink control message multiplexed with uplink data of the uplink data channel. The communications manager 520 is capable of, configured to, or operable to support a means for transmitting, via a wireless communications link between the network entity and the UE, the multiplexed uplink message.

By including or configuring the communications manager 520 in accordance with examples as described herein, the device 505 (e.g., at least one processor controlling or otherwise coupled with the receiver 510, the transmitter 515, the communications manager 520, or a combination thereof) may support techniques for reduced processing, reduced power consumption, and more efficient utilization of communication resources.

Figure 6:
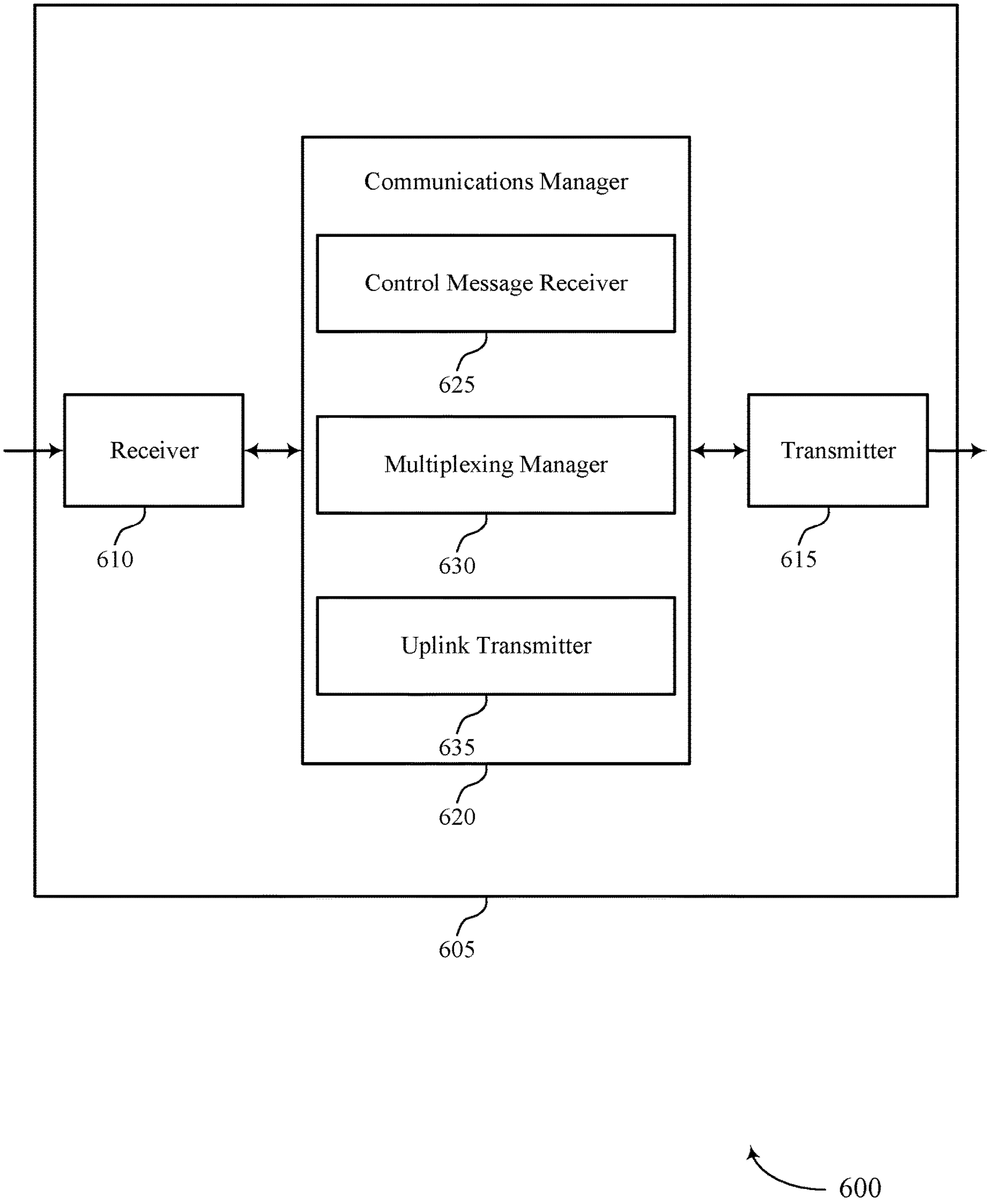

FIG. 6 shows a block diagram 600 of a device 605 that supports modulation rate control for multiplexing in accordance with one or more aspects of the present disclosure. The device 605 may be an example of aspects of a device 505 or a UE 115 as described herein. The device 605 may include a receiver 610, a transmitter 615, and a communications manager 620. The device 605, or one of more components of the device 605 (e.g., the receiver 610, the transmitter 615, the communications manager 620), may include at least one processor, which may be coupled with at least one memory, to support the described techniques. Each of these components may be in communication with one another (e.g., via one or more buses).

The receiver 610 may provide a means for receiving information such as packets, user data, control information, or any combination thereof associated with various information channels (e.g., control channels, data channels, information channels related to modulation rate control for multiplexing). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to modulation rate control for multiplexing). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of modulation rate control for multiplexing as described herein. For example, the communications manager 620 may include a control message receiver 625, a multiplexing manager 630, an uplink transmitter 635, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications in accordance with examples as disclosed herein. The control message receiver 625 is capable of, configured to, or operable to support a means for receiving, from a network entity, a downlink control message indicating the UE to multiplex an uplink control message associated with a first MCS on an uplink data channel associated with a second MCS, where the first MCS has a first modulation order and the second MCS has a second modulation order that is different than the first modulation order. The multiplexing manager 630 is capable of, configured to, or operable to support a means for multiplexing, based on the downlink control message, the uplink control message associated with the first MCS on the uplink data channel associated with the second MCS to generate a multiplexed uplink message including the uplink control message multiplexed with uplink data of the uplink data channel. The uplink transmitter 635 is capable of, configured to, or operable to support a means for transmitting, via a wireless communications link between the network entity and the UE, the multiplexed uplink message.

Figure 7:
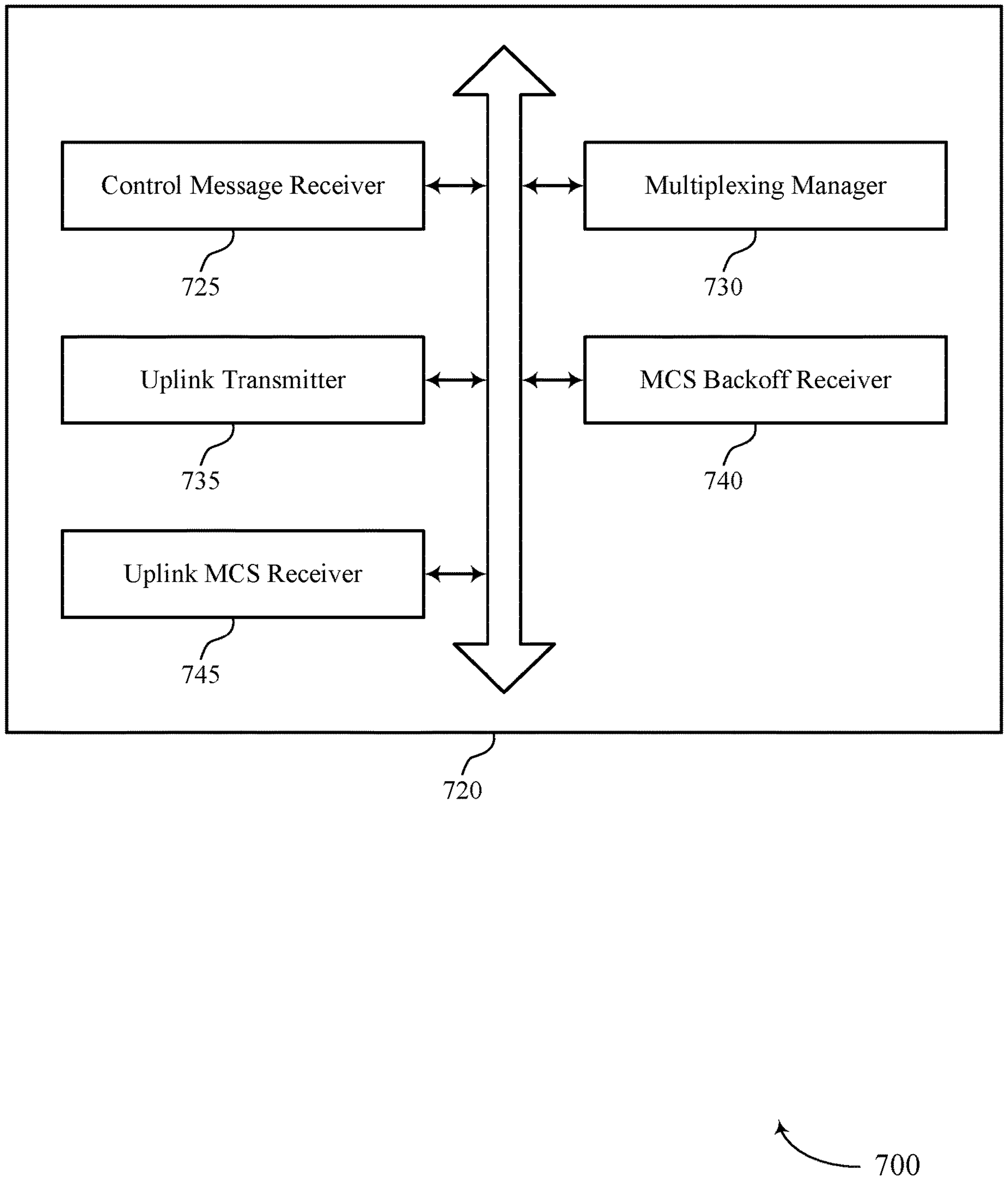
FIG. 7 shows a block diagram of a communications manager that supports modulation rate control for multiplexing in accordance with one or more aspects of the present disclosure.

FIG. 7 shows a block diagram 700 of a communications manager 720 that supports modulation rate control for multiplexing in accordance with one or more aspects of the present disclosure. The communications manager 720 may be an example of aspects of a communications manager 520, a communications manager 620, or both, as described herein. The communications manager 720, or various components thereof, may be an example of means for performing various aspects of modulation rate control for multiplexing as described herein. For example, the communications manager 720 may include a control message receiver 725, a multiplexing manager 730, an uplink transmitter 735, an MCS backoff receiver 740, an uplink MCS receiver 745, or any combination thereof. Each of these components, or components or subcomponents thereof (e.g., one or more processors, one or more memories), may communicate, directly or indirectly, with one another (e.g., via one or more buses).

The communications manager 720 may support wireless communications in accordance with examples as disclosed herein. The control message receiver 725 is capable of, configured to, or operable to support a means for receiving, from a network entity, a downlink control message indicating the UE to multiplex an uplink control message associated with a first MCS on an uplink data channel associated with a second MCS, where the first MCS has a first modulation order and the second MCS has a second modulation order that is different than the first modulation order. The multiplexing manager 730 is capable of, configured to, or operable to support a means for multiplexing, based on the downlink control message, the uplink control message associated with the first MCS on the uplink data channel associated with the second MCS to generate a multiplexed uplink message including the uplink control message multiplexed with uplink data of the uplink data channel. The uplink transmitter 735 is capable of, configured to, or operable to support a means for transmitting, via a wireless communications link between the network entity and the UE, the multiplexed uplink message.

In some examples, the control message receiver 725 is capable of, configured to, or operable to support a means for receiving, as part of the downlink control message, an indication of a data MCS indicator associated with the second MCS and an MCS backoff value, where the first MCS is based on the data MCS indicator and the MCS backoff value.

In some examples, the UE is configured with an MCS table including a set of indexes each associated with a respective MCS. In some examples, the data MCS indicator indicates a second index from the set of indexes that is associated with the second MCS. In some examples, a difference between the second index and the MCS backoff value is equal to a first index of the set of indexes that is associated with the first MCS.

In some examples, the control message receiver 725 is capable of, configured to, or operable to support a means for receiving a second downlink control message that configures the MCS table at the UE.

In some examples, the UE is configured with an MCS-SE (SE) table for transmission uplink control messages that includes a set of SE values each associated with a respective MCS value. In some examples, the data MCS indicator indicates that the uplink data channel is associated with the second MCS which is associated with a second SE value. In some examples, a division between the second SE value and the MCS backoff value is equal to a first SE value. In some examples, the second MCS is associated with an SE value of the set of SE values that is closet in value to the first SE value.

In some examples, the control message receiver 725 is capable of, configured to, or operable to support a means for receiving a second downlink control message that indicates for the UE to use MCS-SE table from a set of multiple MCS-SE tables configured at the UE for transmission of uplink control messages.

In some examples, the downlink control message is a DCI message that indicates the first MCS associated with the uplink control message and the second MCS associated with the uplink data channel.

In some examples, receiving, as part of the DCI message, an MCS backoff value associated with the second MCS, where. In some examples, a first set of bits of the MCS backoff value indicates a scaling factor for a first SE value of the uplink control message relative a second SE value for the uplink data channel. In some examples, a second set of bits of the MCS backoff value indicates the second modulation order. In some examples, the second MCS is based on the first SE value and the second modulation order.

In some examples, the uplink MCS receiver 745 is capable of, configured to, or operable to support a means for receiving, as part of the DCI message, an uplink control MCS indicator indicating that the first MCS is associated with the first modulation order and a first code rate and a data MCS indicator indicating that the second MCS is associated with the second modulation order and a second code rate.

Figure 8:
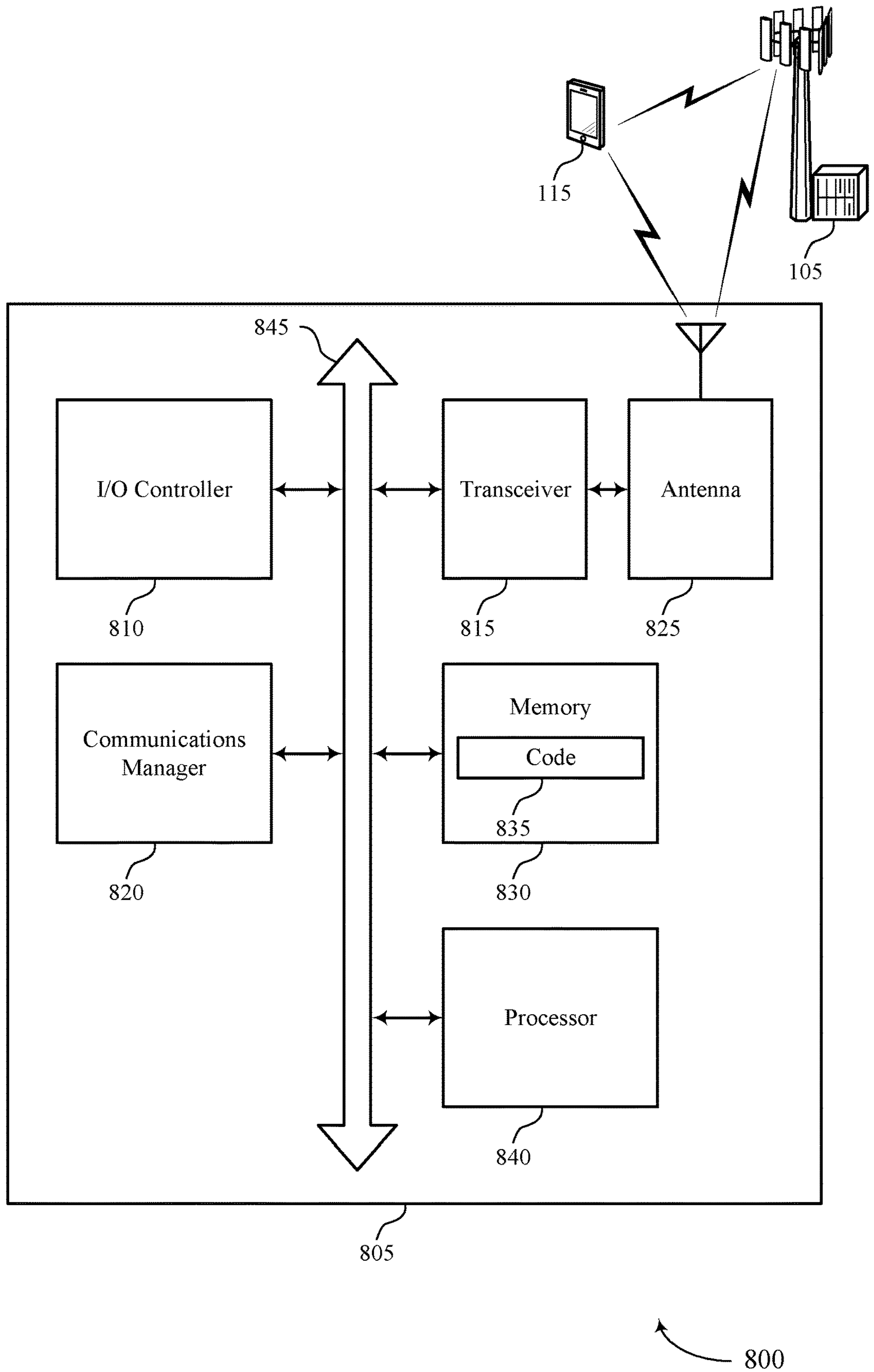
FIG. 8 shows a diagram of a system including a device that supports modulation rate control for multiplexing in accordance with one or more aspects of the present disclosure.

FIG. 8 shows a diagram of a system 800 including a device 805 that supports modulation rate control for multiplexing in accordance with one or more aspects of the present disclosure. The device 805 may be an example of or include components of a device 505, a device 605, or a UE 115 as described herein. The device 805 may communicate (e.g., wirelessly) with one or more other devices (e.g., network entities 105, UEs 115, or a combination thereof). The device 805 may include components for bi-directional voice and data communications including components for transmitting and receiving communications, such as a communications manager 820, an input/output (I/O) controller, such as an I/O controller 810, a transceiver 815, one or more antennas 825, at least one memory 830, code 835, and at least one processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of one or more processors, such as the at least one processor 840. In some cases, a user may interact with the device 805 via the I/O controller 810 or via hardware components controlled by the I/O controller 810.

In some cases, the device 805 may include a single antenna. However, in some other cases, the device 805 may have more than one antenna, which may be capable of concurrently transmitting or receiving multiple wireless transmissions. The transceiver 815 may communicate bi-directionally via the one or more antennas 825 using wired or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The at least one memory 830 may include random access memory (RAM) and read-only memory (ROM). The at least one memory 830 may store computer-readable, computer-executable, or processor-executable code, such as the code 835. The code 835 may include instructions that, when executed by the at least one processor 840, cause the device 805 to perform various functions described herein. The code 835 may be stored in a non-transitory computer-readable medium such as system memory or another type of memory. In some cases, the code 835 may not be directly executable by the at least one processor 840 but may cause a computer (e.g., when compiled and executed) to perform functions described herein. In some cases, the at least one memory 830 may include, among other things, a basic I/O system (BIOS) which may control basic hardware or software operation such as the interaction with peripheral components or devices.

The at least one processor 840 may include one or more intelligent hardware devices (e.g., one or more general-purpose processors, one or more DSPs, one or more CPUs, one or more graphics processing units (GPUs), one or more neural processing units (NPUs) (also referred to as neural network processors or deep learning processors (DLPs)), one or more microcontrollers, one or more ASICs, one or more FPGAs, one or more programmable logic devices, discrete gate or transistor logic, one or more discrete hardware components, or any combination thereof). In some cases, the at least one processor 840 may be configured to operate a memory array using a memory controller. In some other cases, a memory controller may be integrated into the at least one processor 840. The at least one processor 840 may be configured to execute computer-readable instructions stored in a memory (e.g., the at least one memory 830) to cause the device 805 to perform various functions (e.g., functions or tasks supporting modulation rate control for multiplexing). For example, the device 805 or a component of the device 805 may include at least one processor 840 and at least one memory 830 coupled with or to the at least one processor 840, the at least one processor 840 and the at least one memory 830 configured to perform various functions described herein.

In some examples, the at least one processor 840 may include multiple processors and the at least one memory 830 may include multiple memories. One or more of the multiple processors may be coupled with one or more of the multiple memories, which may, individually or collectively, be configured to perform various functions described herein. In some examples, the at least one processor 840 may be a component of a processing system, which may refer to a system (such as a series) of machines, circuitry (including, for example, one or both of processor circuitry (which may include the at least one processor 840) and memory circuitry (which may include the at least one memory 830)), or components, that receives or obtains inputs and processes the inputs to produce, generate, or obtain a set of outputs. The processing system may be configured to perform one or more of the functions described herein. For example, the at least one processor 840 or a processing system including the at least one processor 840 may be configured to, configurable to, or operable to cause the device 805 to perform one or more of the functions described herein. Further, as described herein, being "configured to," being "configurable to," and being "operable to" may be used interchangeably and may be associated with a capability, when executing code 835 (e.g., processor-executable code) stored in the at least one memory 830 or otherwise, to perform one or more of the functions described herein.

The communications manager 820 may support wireless communications in accordance with examples as disclosed herein. For example, the communications manager 820 is capable of, configured to, or operable to support a means for receiving, from a network entity, a downlink control message indicating the UE to multiplex an uplink control message associated with a first MCS on an uplink data channel associated with a second MCS, where the first MCS has a first modulation order and the second MCS has a second modulation order that is different than the first modulation order. The communications manager 820 is capable of, configured to, or operable to support a means for multiplexing, basing at least in part on the downlink control message, the uplink control message associated with the first MCS on the uplink data channel associated with the second MCS to generate a multiplexed uplink message including the uplink control message multiplexed with uplink data of the uplink data channel. The communications manager 820 is capable of, configured to, or operable to support a means for transmitting, via a wireless communications link between the network entity and the UE, the multiplexed uplink message.

By including or configuring the communications manager 820 in accordance with examples as described herein, the device 805 may support techniques for improved communication reliability, reduced latency, more efficient utilization of communication resources, improved coordination between devices, and improved utilization of processing capability.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the at least one processor 840, the at least one memory 830, the code 835, or any combination thereof. For example, the code 835 may include instructions executable by the at least one processor 840 to cause the device 805 to perform various aspects of modulation rate control for multiplexing as described herein, or the at least one processor 840 and the at least one memory 830 may be otherwise configured to, individually or collectively, perform or support such operations.

Figure 9:
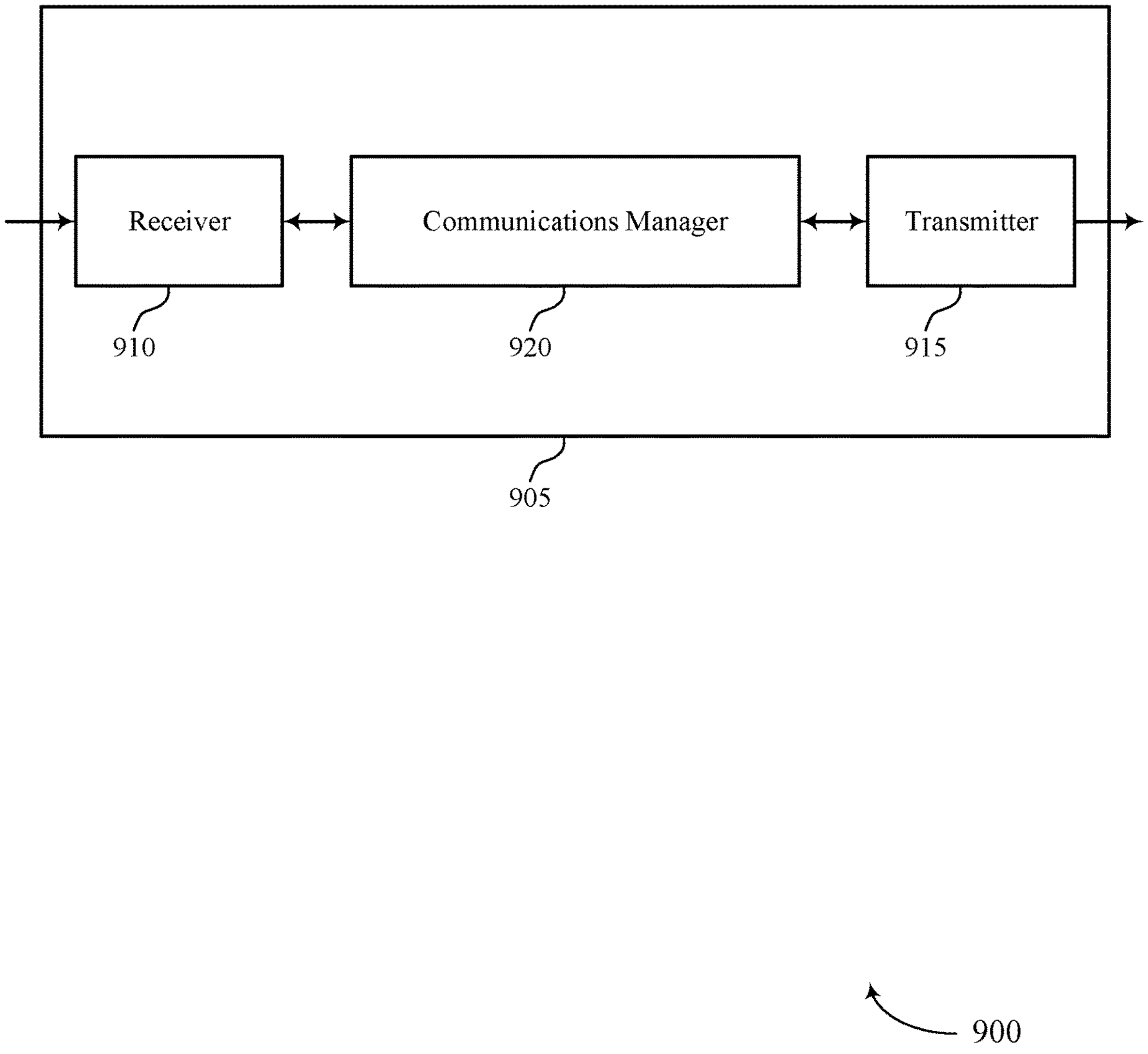
FIGS. 9 and 10 show block diagrams of devices that support modulation rate control for multiplexing in accordance with one or more aspects of the present disclosure.

FIG. 9 shows a block diagram 900 of a device 905 that supports modulation rate control for multiplexing in accordance with one or more aspects of the present disclosure. The device 905 may be an example of aspects of a network entity 105 as described herein. The device 905 may include a receiver 910, a transmitter 915, and a communications manager 920. The device 905, or one or more components of the device 905 (e.g., the receiver 910, the transmitter 915, the communications manager 920), may include at least one processor, which may be coupled with at least one memory, to, individually or collectively, support or enable the described techniques. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations or components thereof may be examples of means for performing various aspects of modulation rate control for multiplexing as described herein. For example, the communications manager 920, the receiver 910, the transmitter 915, or various combinations or components thereof may be capable of performing one or more of the functions described herein.

In some examples, the communications manager 920, the receiver 910, the transmitter 915, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 920, the receiver 910, the transmitter 915, or various combinations or components thereof may be implemented in code (e.g., as communications management software or firmware) executed by at least one processor (e.g., referred to as a processor-executable code). If implemented in code executed by at least one processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications in accordance with examples as disclosed herein. For example, the communications manager 920 is capable of, configured to, or operable to support a means for outputting, to a UE, a downlink control message indicating the UE to multiplex an uplink control message associated with a first MCS on an uplink data channel associated with a second MCS, where the first MCS has a first modulation order and the second MCS has a second modulation order that is different than the first modulation order. The communications manager 920 is capable of, configured to, or operable to support a means for obtaining, via a wireless communications link between the network entity and the UE, a multiplexed uplink message including the uplink control message multiplexed with uplink data of the uplink data channel, where the uplink control message is associated with the first MCS on the uplink data channel associated with the second MCS.

By including or configuring the communications manager 920 in accordance with examples as described herein, the device 905 (e.g., at least one processor controlling or otherwise coupled with the receiver 910, the transmitter 915, the communications manager 920, or a combination thereof) may support techniques for reduced processing, reduced power consumption, and more efficient utilization of communication resources.

Figure 10:
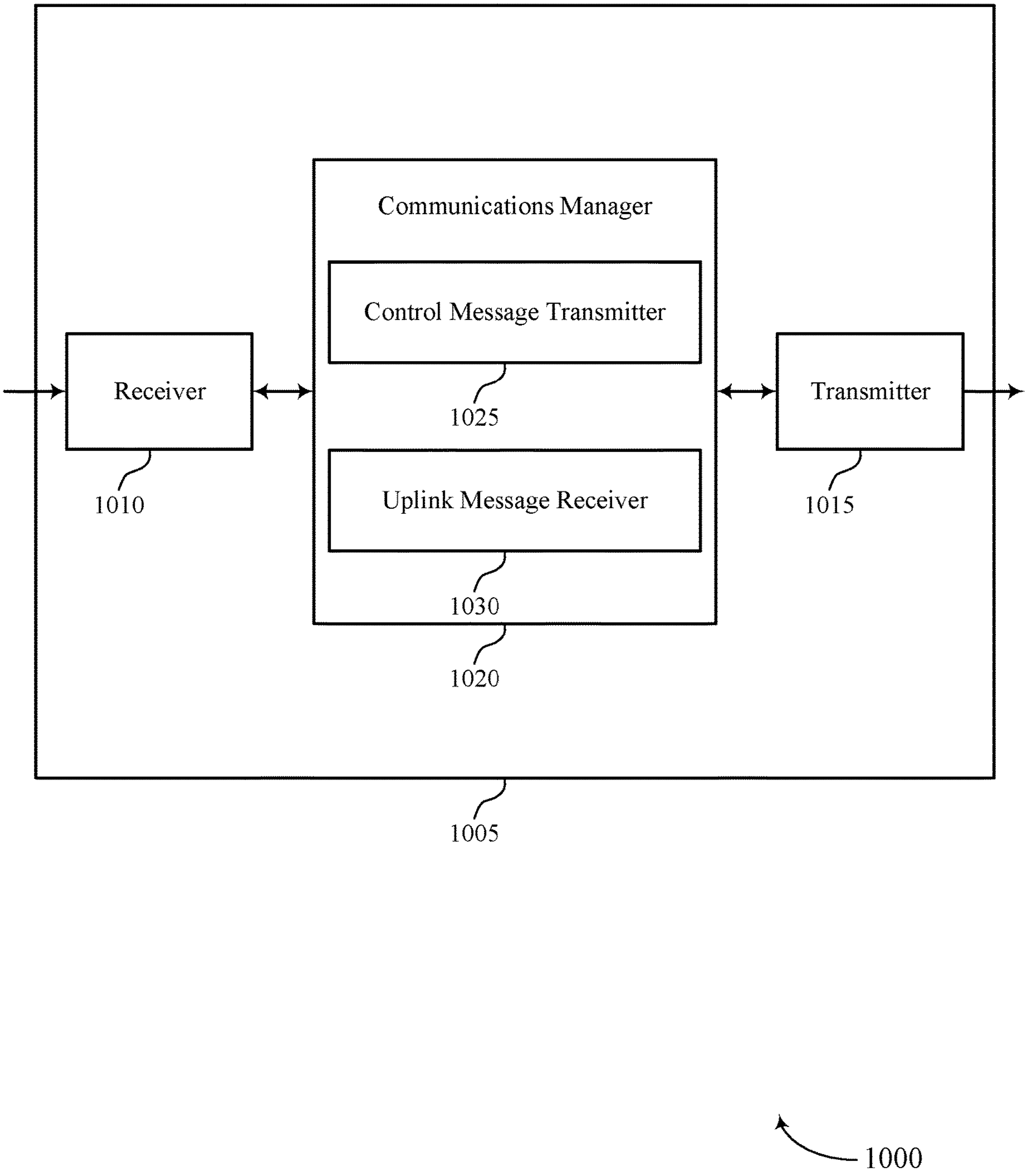

FIG. 10 shows a block diagram 1000 of a device 1005 that supports modulation rate control for multiplexing in accordance with one or more aspects of the present disclosure. The device 1005 may be an example of aspects of a device 905 or a network entity 105 as described herein. The device 1005 may include a receiver 1010, a transmitter 1015, and a communications manager 1020. The device 1005, or one of more components of the device 1005 (e.g., the receiver 1010, the transmitter 1015, the communications manager 1020), may include at least one processor, which may be coupled with at least one memory, to support the described techniques. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of modulation rate control for multiplexing as described herein. For example, the communications manager 1020 may include a control message transmitter 1025 an uplink message receiver 1030, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications in accordance with examples as disclosed herein. The control message transmitter 1025 is capable of, configured to, or operable to support a means for outputting, to a UE, a downlink control message indicating the UE to multiplex an uplink control message associated with a first MCS on an uplink data channel associated with a second MCS, where the first MCS has a first modulation order and the second MCS has a second modulation order that is different than the first modulation order. The uplink message receiver 1030 is capable of, configured to, or operable to support a means for obtaining, via a wireless communications link between the network entity and the UE, a multiplexed uplink message including the uplink control message multiplexed with uplink data of the uplink data channel, where the uplink control message is associated with the first MCS on the uplink data channel associated with the second MCS.

Figure 11:
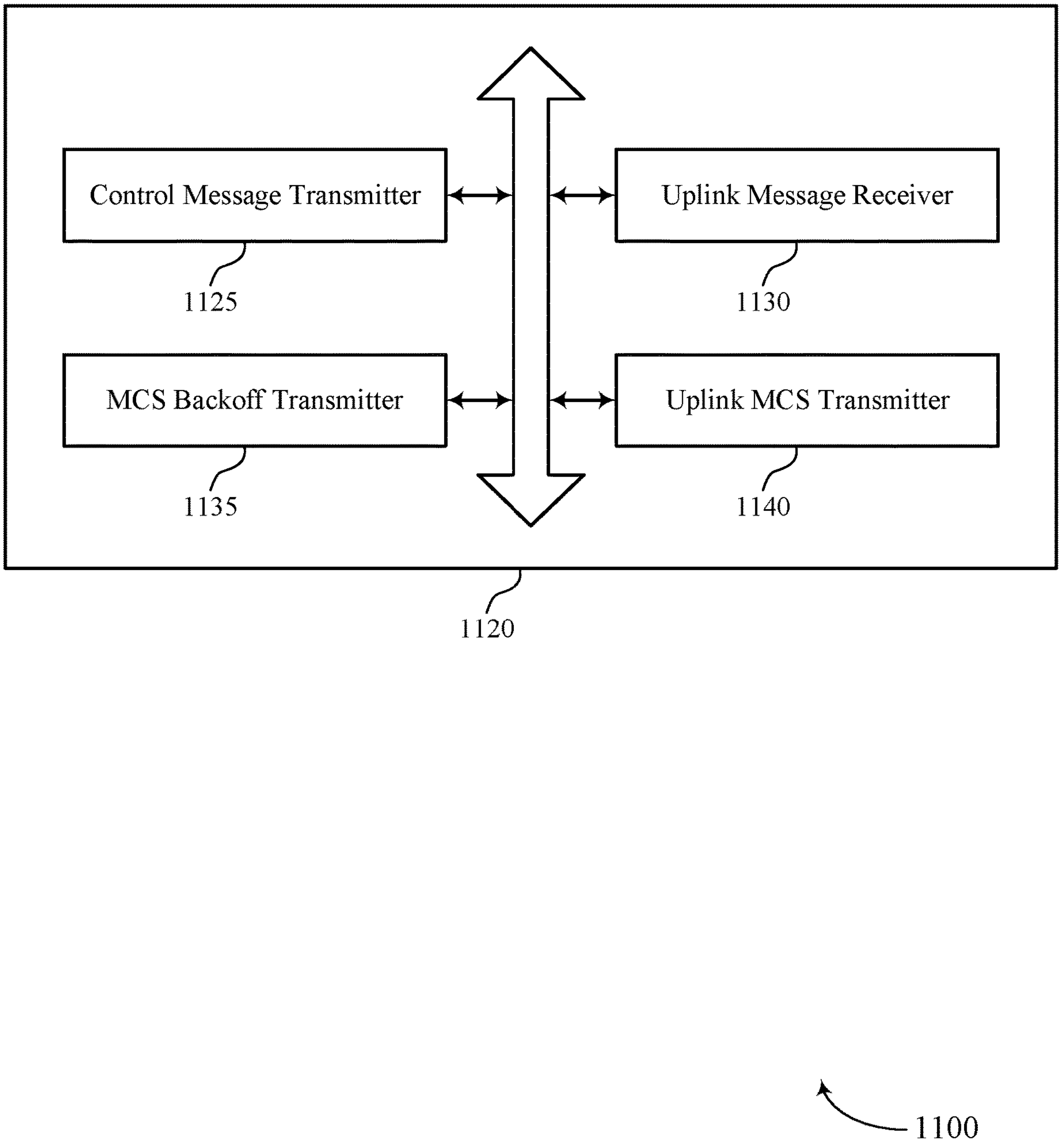
FIG. 11 shows a block diagram of a communications manager that supports modulation rate control for multiplexing in accordance with one or more aspects of the present disclosure.

FIG. 11 shows a block diagram 1100 of a communications manager 1120 that supports modulation rate control for multiplexing in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of modulation rate control for multiplexing as described herein. For example, the communications manager 1120 may include a control message transmitter 1125, an uplink message receiver 1130, an MCS backoff transmitter 1135, an uplink MCS transmitter 1140, or any combination thereof. Each of these components, or components or subcomponents thereof (e.g., one or more processors, one or more memories), may communicate, directly or indirectly, with one another (e.g., via one or more buses). The communications may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1120 may support wireless communications in accordance with examples as disclosed herein. The control message transmitter 1125 is capable of, configured to, or operable to support a means for outputting, to a UE, a downlink control message indicating the UE to multiplex an uplink control message associated with a first MCS on an uplink data channel associated with a second MCS, where the first MCS has a first modulation order and the second MCS has a second modulation order that is different than the first modulation order. The uplink message receiver 1130 is capable of, configured to, or operable to support a means for obtaining, via a wireless communications link between the network entity and the UE, a multiplexed uplink message including the uplink control message multiplexed with uplink data of the uplink data channel, where the uplink control message is associated with the first MCS on the uplink data channel associated with the second MCS.

In some examples, the control message transmitter 1125 is capable of, configured to, or operable to support a means for outputting, as part of the downlink control message, an indication of a data MCS indicator associated with the second MCS and an MCS backoff value, where the first MCS is based on the data MCS indicator and the MCS backoff value.

In some examples, the UE is configured with an MCS table including a set of indexes each associated with a respective MCS. In some examples, the data MCS indicator indicates a second index from the set of indexes that is associated with the second MCS. In some examples, a difference between the second index and the MCS backoff value is equal to a first index of the set of indexes that is associated with the first MCS.

In some examples, the control message transmitter 1125 is capable of, configured to, or operable to support a means for outputting a second downlink control message that configures the MCS table at the UE.

In some examples, the UE is configured with an MCS-SE (SE) table for transmission uplink control messages that includes a set of SE values each associated with a respective MCS value. In some examples, the data MCS indicator indicates that the uplink data channel is associated with the second MCS which is associated with a second SE value. In some examples, a division between the second SE value and the MCS backoff value is equal to a first SE value. In some examples, the second MCS is associated with an SE value of the set of SE values that is closet in value to the first SE value.

In some examples, the control message transmitter 1125 is capable of, configured to, or operable to support a means for outputting a second downlink control message that indicates for the UE to use MCS-SE table from a set of multiple MCS-SE tables configured at the UE for transmission of uplink control messages.

In some examples, the downlink control message is a DCI message that indicates the first MCS associated with the uplink control message and the second MCS associated with the uplink data channel.

In some examples, the MCS backoff transmitter 1135 is capable of, configured to, or operable to support a means for outputting, as part of the DCI message, an MCS backoff value associated with the second MCS, where. In some examples, the MCS backoff transmitter 1135 is capable of, configured to, or operable to support a means for a first set of bits of the MCS backoff value indicates a scaling factor for a first SE value of the uplink control message relative a second SE value for the uplink data channel. In some examples, the MCS backoff transmitter 1135 is capable of, configured to, or operable to support a means for a second set of bits of the MCS backoff value indicates the second modulation order. In some examples, the MCS backoff transmitter 1135 is capable of, configured to, or operable to support a means for the second MCS is based on the first SE value and the second modulation order.

In some examples, the uplink MCS transmitter 1140 is capable of, configured to, or operable to support a means for outputting, as part of the DCI message, an uplink control MCS indicator indicating that the first MCS is associated with the first modulation order and a first code rate and a data MCS indicator indicating that the second MCS is associated with the second modulation order and a second code rate.

Figure 12:
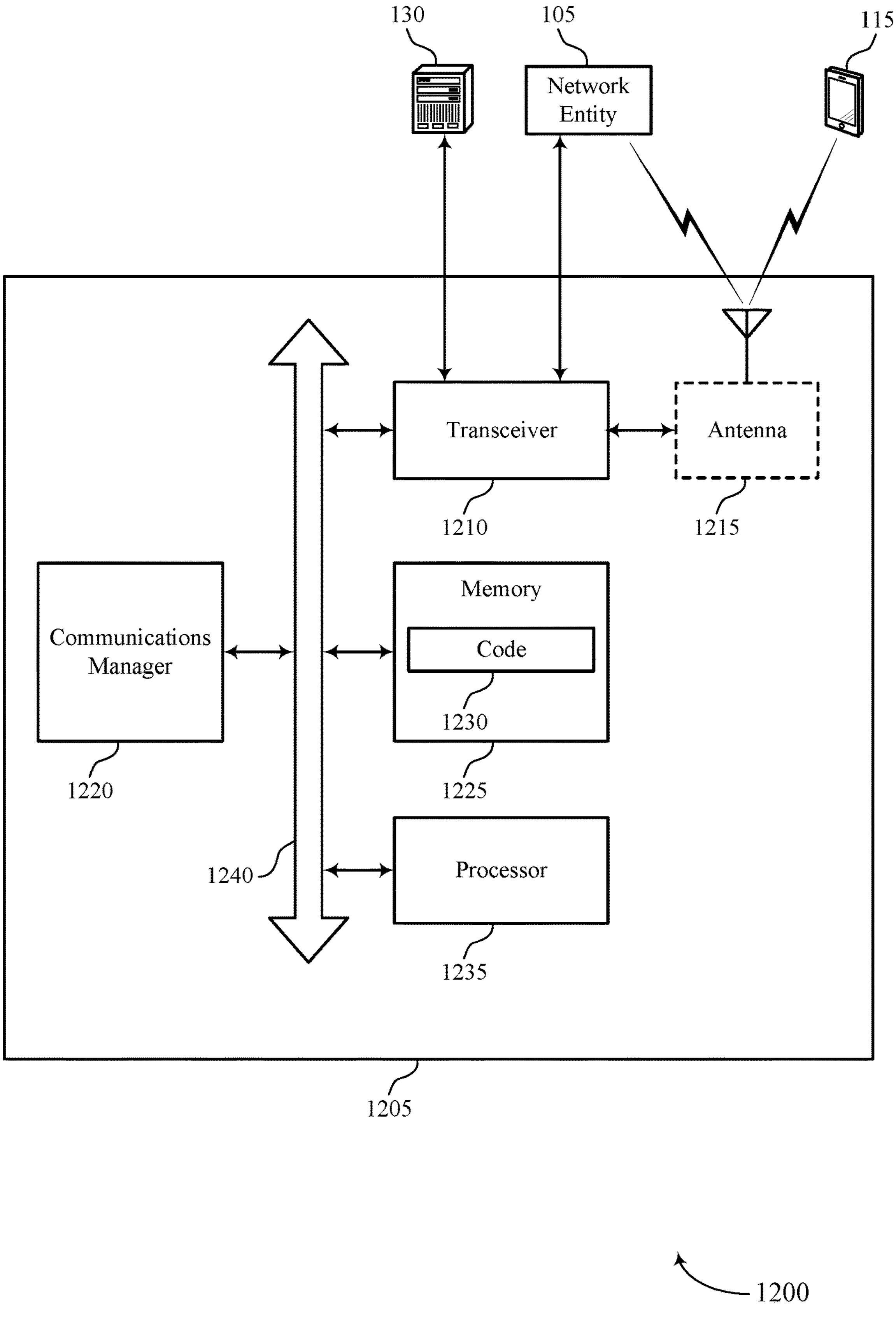
FIG. 12 shows a diagram of a system including a device that supports modulation rate control for multiplexing in accordance with one or more aspects of the present disclosure.

FIG. 12 shows a diagram of a system 1200 including a device 1205 that supports modulation rate control for multiplexing in accordance with one or more aspects of the present disclosure. The device 1205 may be an example of or include components of a device 905, a device 1005, or a network entity 105 as described herein. The device 1205 may communicate with other network devices or network equipment such as one or more of the network entities 105, UEs 115, or any combination thereof. The communications may include communications over one or more wired interfaces, over one or more wireless interfaces, or any combination thereof. The device 1205 may include components that support outputting and obtaining communications, such as a communications manager 1220, a transceiver 1210, one or more antennas 1215, at least one memory 1225, code 1230, and at least one processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. In some implementations, the transceiver 1210 may include one or more interfaces, such as one or more interfaces coupled with the one or more antennas 1215 that are configured to support various receiving or obtaining operations, or one or more interfaces coupled with the one or more antennas 1215 that are configured to support various transmitting or outputting operations, or a combination thereof. In some implementations, the transceiver 1210 may include or be configured for coupling with one or more processors or one or more memory components that are operable to perform or support operations based on received or obtained information or signals, or to generate information or other signals for transmission or other outputting, or any combination thereof. In some implementations, the transceiver 1210, or the transceiver 1210 and the one or more antennas 1215, or the transceiver 1210 and the one or more antennas 1215 and one or more processors or one or more memory components (e.g., the at least one processor 1235, the at least one memory 1225, or both), may be included in a chip or chip assembly that is installed in the device 1205. In some examples, the transceiver 1210 may be operable to support communications via one or more communications links (e.g., communication link(s) 125, backhaul communication link(s) 120, a midhaul communication link 162, a fronthaul communication link 168).

The at least one memory 1225 may include RAM, ROM, or any combination thereof. The at least one memory 1225 may store computer-readable, computer-executable, or processor-executable code, such as the code 1230. The code 1230 may include instructions that, when executed by one or more of the at least one processor 1235, cause the device 1205 to perform various functions described herein. The code 1230 may be stored in a non-transitory computer-readable medium such as system memory or another type of memory. In some cases, the code 1230 may not be directly executable by a processor of the at least one processor 1235 but may cause a computer (e.g., when compiled and executed) to perform functions described herein. In some cases, the at least one memory 1225 may include, among other things, a BIOS which may control basic hardware or software operation such as the interaction with peripheral components or devices. In some examples, the at least one processor 1235 may include multiple processors and the at least one memory 1225 may include multiple memories. One or more of the multiple processors may be coupled with one or more of the multiple memories which may, individually or collectively, be configured to perform various functions herein (for example, as part of a processing system).

The at least one processor 1235 may include one or more intelligent hardware devices (e.g., one or more general-purpose processors, one or more DSPs, one or more CPUs, one or more graphics processing units (GPUs), one or more neural processing units (NPUs) (also referred to as neural network processors or deep learning processors (DLPs)), one or more microcontrollers, one or more ASICs, one or more FPGAs, one or more programmable logic devices, discrete gate or transistor logic, one or more discrete hardware components, or any combination thereof). In some cases, the at least one processor 1235 may be configured to operate a memory array using a memory controller. In some other cases, a memory controller may be integrated into one or more of the at least one processor 1235. The at least one processor 1235 may be configured to execute computer-readable instructions stored in a memory (e.g., one or more of the at least one memory 1225) to cause the device 1205 to perform various functions (e.g., functions or tasks supporting modulation rate control for multiplexing). For example, the device 1205 or a component of the device 1205 may include at least one processor 1235 and at least one memory 1225 coupled with one or more of the at least one processor 1235, the at least one processor 1235 and the at least one memory 1225 configured to perform various functions described herein. The at least one processor 1235 may be an example of a cloud-computing platform (e.g., one or more physical nodes and supporting software such as operating systems, virtual machines, or container instances) that may host the functions (e.g., by executing code 1230) to perform the functions of the device 1205. The at least one processor 1235 may be any one or more suitable processors capable of executing scripts or instructions of one or more software programs stored in the device 1205 (such as within one or more of the at least one memory 1225).

In some examples, the at least one processor 1235 may include multiple processors and the at least one memory 1225 may include multiple memories. One or more of the multiple processors may be coupled with one or more of the multiple memories, which may, individually or collectively, be configured to perform various functions herein. In some examples, the at least one processor 1235 may be a component of a processing system, which may refer to a system (such as a series) of machines, circuitry (including, for example, one or both of processor circuitry (which may include the at least one processor 1235) and memory circuitry (which may include the at least one memory 1225)), or components, that receives or obtains inputs and processes the inputs to produce, generate, or obtain a set of outputs. The processing system may be configured to perform one or more of the functions described herein. For example, the at least one processor 1235 or a processing system including the at least one processor 1235 may be configured to, configurable to, or operable to cause the device 1205 to perform one or more of the functions described herein. Further, as described herein, being "configured to," being "configurable to," and being "operable to" may be used interchangeably and may be associated with a capability, when executing code stored in the at least one memory 1225 or otherwise, to perform one or more of the functions described herein.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the at least one memory 1225, the code 1230, and the at least one processor 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with one or more other network entities 105, and may include a controller or scheduler for controlling communications with UEs 115 (e.g., in cooperation with the one or more other network devices). In some examples, the communications manager 1220 may support an X2 interface within an LTE/LTE-A wireless communications network technology to provide communication between network entities 105.

The communications manager 1220 may support wireless communications in accordance with examples as disclosed herein. For example, the communications manager 1220 is capable of, configured to, or operable to support a means for outputting, to a UE, a downlink control message indicating the UE to multiplex an uplink control message associated with a first MCS on an uplink data channel associated with a second MCS, where the first MCS has a first modulation order and the second MCS has a second modulation order that is different than the first modulation order. The communications manager 1220 is capable of, configured to, or operable to support a means for obtaining, via a wireless communications link between the network entity and the UE, a multiplexed uplink message including the uplink control message multiplexed with uplink data of the uplink data channel, where the uplink control message is associated with the first MCS on the uplink data channel associated with the second MCS.

By including or configuring the communications manager 1220 in accordance with examples as described herein, the device 1205 may support techniques for improved communication reliability, reduced latency, more efficient utilization of communication resources, improved coordination between devices, and improved utilization of processing capability.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the transceiver 1210, one or more of the at least one processor 1235, one or more of the at least one memory 1225, the code 1230, or any combination thereof (for example, by a processing system including at least a portion of the at least one processor 1235, the at least one memory 1225, the code 1230, or any combination thereof). For example, the code 1230 may include instructions executable by one or more of the at least one processor 1235 to cause the device 1205 to perform various aspects of modulation rate control for multiplexing as described herein, or the at least one processor 1235 and the at least one memory 1225 may be otherwise configured to, individually or collectively, perform or support such operations.

Figure 13:
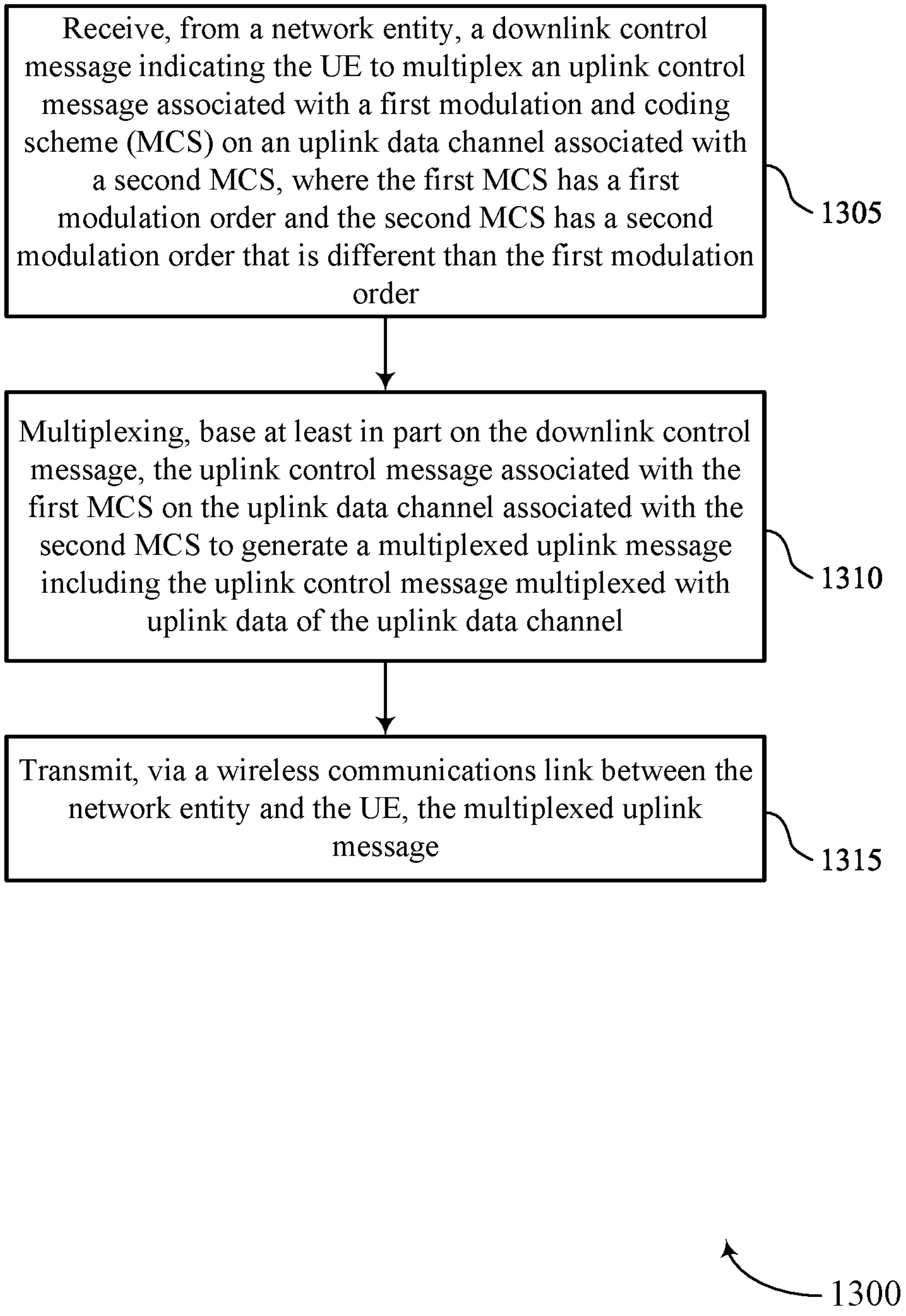
FIGS. 13 and 14 show flowcharts illustrating methods that support modulation rate control for multiplexing in accordance with one or more aspects of the present disclosure.

FIG. 13 shows a flowchart illustrating a method 1300 that supports modulation rate control for multiplexing in accordance with one or more aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include receiving, from a network entity, a downlink control message indicating the UE to multiplex an uplink control message associated with a first MCS on an uplink data channel associated with a second MCS, where the first MCS has a first modulation order and the second MCS has a second modulation order that is different than the first modulation order. The operations of 1305 may be performed in accordance with examples as disclosed herein. In some examples, aspects of the operations of 1305 may be performed by a control message receiver 725 as described with reference to FIG. 7.

At 1310, the method may include multiplexing, based on the downlink control message, the uplink control message associated with the first MCS on the uplink data channel associated with the second MCS to generate a multiplexed uplink message including the uplink control message multiplexed with uplink data of the uplink data channel. The operations of 1310 may be performed in accordance with examples as disclosed herein. In some examples, aspects of the operations of 1310 may be performed by a multiplexing manager 730 as described with reference to FIG. 7.

At 1315, the method may include transmitting, via a wireless communications link between the network entity and the UE, the multiplexed uplink message. The operations of 1315 may be performed in accordance with examples as disclosed herein. In some examples, aspects of the operations of 1315 may be performed by an uplink transmitter 735 as described with reference to FIG. 7.

Figure 14:
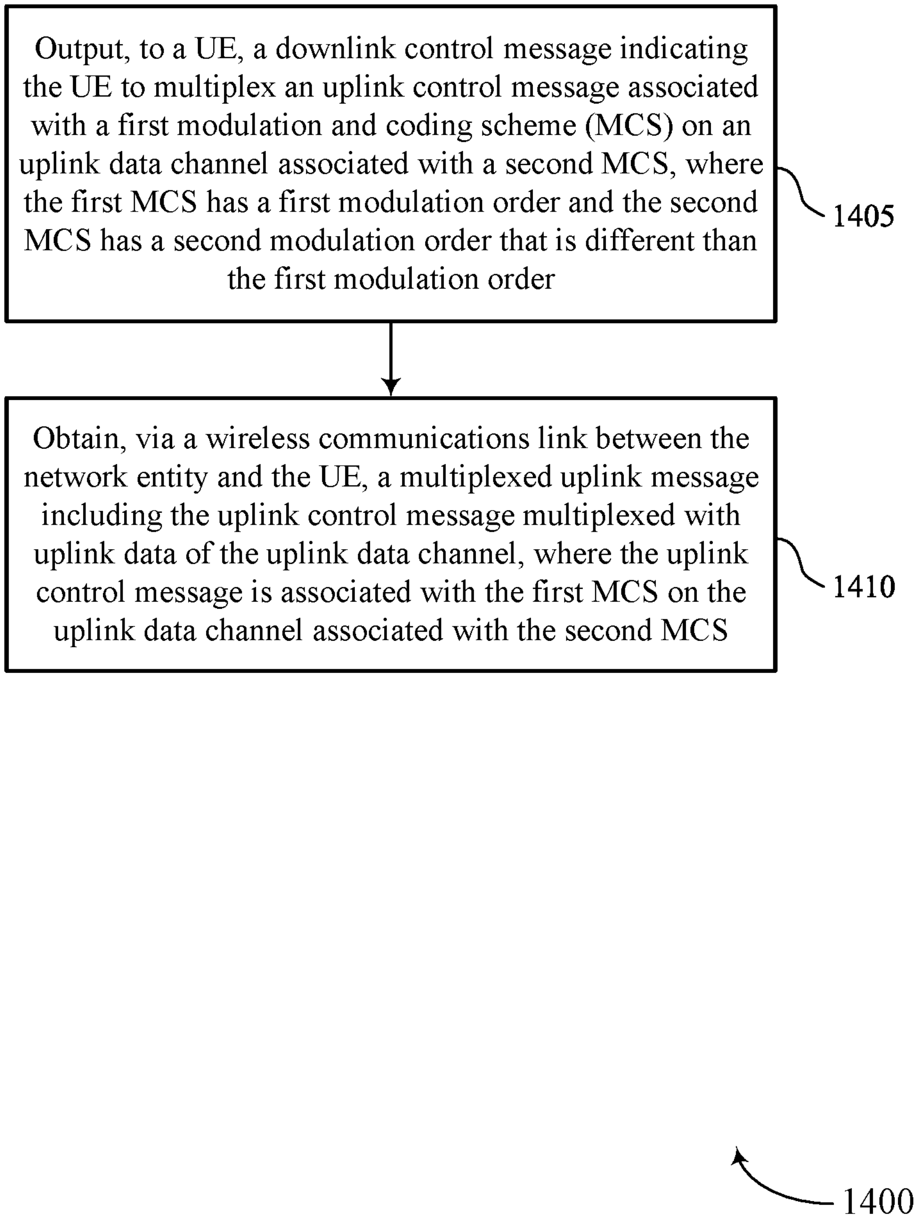

FIG. 14 shows a flowchart illustrating a method 1400 that supports modulation rate control for multiplexing in accordance with one or more aspects of the present disclosure. The operations of the method 1400 may be implemented by a network entity or its components as described herein. For example, the operations of the method 1400 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1405, the method may include outputting, to a UE, a downlink control message indicating the UE to multiplex an uplink control message associated with a first MCS on an uplink data channel associated with a second MCS, where the first MCS has a first modulation order and the second MCS has a second modulation order that is different than the first modulation order. The operations of 1405 may be performed in accordance with examples as disclosed herein. In some examples, aspects of the operations of 1405 may be performed by a control message transmitter 1125 as described with reference to FIG. 11.

At 1410, the method may include obtaining, via a wireless communications link between the network entity and the UE, a multiplexed uplink message including the uplink control message multiplexed with uplink data of the uplink data channel, where the uplink control message is associated with the first MCS on the uplink data channel associated with the second MCS. The operations of 1410 may be performed in accordance with examples as disclosed herein. In some examples, aspects of the operations of 1410 may be performed by an uplink message receiver 1130 as described with reference to FIG. 11.

The following provides an overview of aspects of the present disclosure:

Aspect 1: A method for wireless communications, at a UE, comprising: receiving, from a network entity, a downlink control message indicating the UE to multiplex an uplink control message associated with a first MCS on an uplink data channel associated with a second MCS, wherein the first MCS has a first modulation order and the second MCS has a second modulation order that is different than the first modulation order; multiplexing, based at least in part on the downlink control message, the uplink control message associated with the first MCS on the uplink data channel associated with the second MCS to generate a multiplexed uplink message comprising the uplink control message multiplexed with uplink data of the uplink data channel; and transmitting, via a wireless communications link between the network entity and the UE, the multiplexed uplink message.

Aspect 2: The method of aspect 1, further comprising: receiving, as part of the downlink control message, an indication of a data MCS indicator associated with the second MCS and an MCS backoff value, wherein the first MCS is based at least in part on the data MCS indicator and the MCS backoff value.

Aspect 3: The method of aspect 2, wherein the UE is configured with an MCS table comprising a set of indexes each associated with a respective MCS; the data MCS indicator indicates a second index from the set of indexes that is associated with the second MCS; and a difference between the second index and the MCS backoff value is equal to a first index of the set of indexes that is associated with the first MCS.

Aspect 4: The method of aspect 3, further comprising: receiving a second downlink control message that configures the MCS table at the UE.

Aspect 5: The method of any of aspects 2 through 4, wherein the UE is configured with an MCS-SE table for transmission uplink control messages that comprises a set of SE values each associated with a respective MCS value; the data MCS indicator indicates that the uplink data channel is associated with the second MCS which is associated with a second SE value; a division between the second SE value and the MCS backoff value is equal to a first SE value; and the second MCS is associated with an SE value of the set of SE values that is closet in value to the first SE value.

Aspect 6: The method of aspect 5, further comprising: receiving a second downlink control message that indicates for the UE to use MCS-SE table from a plurality of MCS-SE tables configured at the UE for transmission of uplink control messages.

Aspect 7: The method of any of aspects 1 through 6, wherein the downlink control message is a DCI message that indicates the first MCS associated with the uplink control message and the second MCS associated with the uplink data channel.

Aspect 8: The method of aspect 7, wherein receiving, as part of the DCI message, an MCS backoff value associated with the second MCS, wherein; a first set of bits of the MCS backoff value indicates a scaling factor for a first SE value of the uplink control message relative a second SE value for the uplink data channel; a second set of bits of the MCS backoff value indicates the second modulation order; and the second MCS is based at least in part on the first SE value and the second modulation order.

Aspect 9: The method of any of aspects 7 through 8, further comprising: receiving, as part of the DCI message, an uplink control MCS indicator indicating that the first MCS is associated with the first modulation order and a first code rate and a data MCS indicator indicating that the second MCS is associated with the second modulation order and a second code rate.

Aspect 10: A method for wireless communications, at a network entity, comprising: outputting, to a UE, a downlink control message indicating the UE to multiplex an uplink control message associated with a first MCS on an uplink data channel associated with a second MCS, wherein the first MCS has a first modulation order and the second MCS has a second modulation order that is different than the first modulation order; and obtaining, via a wireless communications link between the network entity and the UE, a multiplexed uplink message comprising the uplink control message multiplexed with uplink data of the uplink data channel, wherein the uplink control message is associated with the first MCS on the uplink data channel associated with the second MCS.

Aspect 11: The method of aspect 10, further comprising: outputting, as part of the downlink control message, an indication of a data MCS indicator associated with the second MCS and an MCS backoff value, wherein the first MCS is based at least in part on the data MCS indicator and the MCS backoff value.

Aspect 12: The method of aspect 11, wherein the UE is configured with an MCS table comprising a set of indexes each associated with a respective MCS; the data MCS indicator indicates a second index from the set of indexes that is associated with the second MCS; and a difference between the second index and the MCS backoff value is equal to a first index of the set of indexes that is associated with the first MCS.

Aspect 13: The method of aspect 12, further comprising: outputting a second downlink control message that configures the MCS table at the UE.

Aspect 14: The method of any of aspects 11 through 13, wherein the UE is configured with an MCS-SE table for transmission uplink control messages that comprises a set of SE values each associated with a respective MCS value; the data MCS indicator indicates that the uplink data channel is associated with the second MCS which is associated with a second SE value; a division between the second SE value and the MCS backoff value is equal to a first SE value; and the second MCS is associated with an SE value of the set of SE values that is closet in value to the first SE value.

Aspect 15: The method of aspect 14, further comprising: outputting a second downlink control message that indicates for the UE to use MCS-SE table from a plurality of MCS-SE tables configured at the UE for transmission of uplink control messages.

Aspect 16: The method of any of aspects 10 through 15, wherein the downlink control message is a DCI message that indicates the first MCS associated with the uplink control message and the second MCS associated with the uplink data channel.

Aspect 17: The method of aspect 16, further comprising: outputting, as part of the DCI message, an MCS backoff value associated with the second MCS, wherein; a first set of bits of the MCS backoff value indicates a scaling factor for a first SE value of the uplink control message relative a second SE value for the uplink data channel; a second set of bits of the MCS backoff value indicates the second modulation order; and the second MCS is based at least in part on the first SE value and the second modulation order.

Aspect 18: The method of any of aspects 16 through 17, further comprising: outputting, as part of the DCI message, an uplink control MCS indicator indicating that the first MCS is associated with the first modulation order and a first code rate and a data MCS indicator indicating that the second MCS is associated with the second modulation order and a second code rate.

Aspect 19: A UE for wireless communications, comprising one or more memories storing processor-executable code, and one or more processors coupled with the one or more memories and individually or collectively operable to execute the code to cause the UE to perform a method of any of aspects 1 through 9.

Aspect 20: A UE for wireless communications, comprising at least one means for performing a method of any of aspects 1 through 9.

Aspect 21: A non-transitory computer-readable medium storing code for wireless communications, the code comprising instructions executable by one or more processors to perform a method of any of aspects 1 through 9.

Aspect 22: A network entity for wireless communications, comprising one or more memories storing processor-executable code, and one or more processors coupled with the one or more memories and individually or collectively operable to execute the code to cause the network entity to perform a method of any of aspects 10 through 18.

Aspect 23: A network entity for wireless communications, comprising at least one means for performing a method of any of aspects 10 through 18.

Aspect 24: A non-transitory computer-readable medium storing code for wireless communications, the code comprising instructions executable by one or more processors to perform a method of any of aspects 10 through 18.

It should be noted that the methods described herein describe possible implementations. The operations and the steps may be rearranged or otherwise modified and other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, a graphics processing unit (GPU), a neural processing unit (NPU), an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk, and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database, or another data structure), ascertaining, and the like. Also, "determining" can include receiving (e.g., receiving information), accessing (e.g., accessing data stored in memory), and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label or other subsequent reference label.

The description set forth herein, in connection with the appended drawings, describes example configurations and does not represent all the examples that may be implemented or that are within the scope of the claims. The term "example" used herein means "serving as an example, instance, or illustration" and not "preferred" or "advantageous over other examples." The detailed description includes specific details for the purpose of providing an understanding of the described techniques. These techniques, however, may be practiced without these specific details. In some figures, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE), comprising:

one or more memories storing processor-executable code; and one or more processors coupled with the one or more memories and individually or collectively operable to execute the code to cause the UE to:

receive, from a network entity, a downlink control message indicating the UE to multiplex an uplink control message associated with a first modulation and coding scheme (MCS) on an uplink data channel associated with a second MCS, wherein the first MCS has a first modulation order and the second MCS has a second modulation order that is different than the first modulation order;

multiplex, based at least in part on the downlink control message, the uplink control message associated with the first MCS on the uplink data channel associated with the second MCS to generate a multiplexed uplink message comprising the uplink control message multiplexed with uplink data of the uplink data channel; and transmit, via a wireless communications link between the network entity and the UE, the multiplexed uplink message.

2. The UE of claim 1, wherein the one or more processors are individually or collectively further operable to execute the code to cause the UE to:

receive, as part of the downlink control message, an indication of a data MCS indicator associated with the second MCS and an MCS backoff value, wherein the first MCS is based at least in part on the data MCS indicator and the MCS backoff value.

3. The UE of claim 2, wherein:

the UE is configured with an MCS table comprising a set of indexes each associated with a respective MCS;

the data MCS indicator indicates a second index from the set of indexes that is associated with the second MCS; and a difference between the second index and the MCS backoff value is equal to a first index of the set of indexes that is associated with the first MCS.

4. The UE of claim 3, wherein the one or more processors are individually or collectively further operable to execute the code to cause the UE to:

receive a second downlink control message that configures the MCS table at the UE.

5. The UE of claim 2, wherein:

the UE is configured with an MCS-spectral efficiency (SE) table for transmission of uplink control messages that comprises a set of SE values each associated with a respective MCS value;

the data MCS indicator indicates that the uplink data channel is associated with the second MCS which is associated with a second SE value;

a division between the second SE value and the MCS backoff value is equal to a first SE value; and the second MCS is associated with an SE value of the set of SE values that is closet closest in value to the first SE value.

6. The UE of claim 5, wherein the one or more processors are individually or collectively further operable to execute the code to cause the UE to:

receive a second downlink control message that indicates for the UE to use the MCS-SE table from a plurality of MCS-SE tables configured at the UE for transmission of uplink control messages.

7. The UE of claim 1, wherein the downlink control message is a downlink control information (DCI) message that indicates the first MCS associated with the uplink control message and the second MCS associated with the uplink data channel.

8. The UE of claim 7, wherein the one or more processors are individually or collectively further operable to execute the code to cause the UE to:

receive, as part of the DCI message, an MCS backoff value associated with the second MCS, wherein:

a first set of bits of the MCS backoff value indicates a scaling factor for a first spectral efficiency (SE) value of the uplink control message relative a second SE value for the uplink data channel;

a second set of bits of the MCS backoff value indicates the second modulation order; and the second MCS is based at least in part on the first SE value and the second modulation order.

9. The UE of claim 7, wherein the one or more processors are individually or collectively further operable to execute the code to cause the UE to:

receive, as part of the DCI message, an uplink control MCS indicator indicating that the first MCS is associated with the first modulation order and a first code rate and a data MCS indicator indicating that the second MCS is associated with the second modulation order and a second code rate.

10. A network entity, comprising:

one or more memories storing processor-executable code; and one or more processors coupled with the one or more memories and individually or collectively operable to execute the code to cause the network entity to:

output, to a user equipment (UE), a downlink control message indicating the UE to multiplex an uplink control message associated with a first modulation and coding scheme (MCS) on an uplink data channel associated with a second MCS, wherein the first MCS has a first modulation order and the second MCS has a second modulation order that is different than the first modulation order; and obtain, via a wireless communications link between the network entity and the UE, a multiplexed uplink message comprising the uplink control message multiplexed with uplink data of the uplink data channel, wherein the uplink control message is associated with the first MCS on the uplink data channel associated with the second MCS.

11. The network entity of claim 10, wherein the one or more processors are individually or collectively further operable to execute the code to cause the network entity to:

output, as part of the downlink control message, an indication of a data MCS indicator associated with the second MCS and an MCS backoff value, wherein the first MCS is based at least in part on the data MCS indicator and the MCS backoff value.

12. The network entity of claim 11, wherein:

the UE is configured with an MCS table comprising a set of indexes each associated with a respective MCS;

the data MCS indicator indicates a second index from the set of indexes that is associated with the second MCS; and a difference between the second index and the MCS backoff value is equal to a first index of the set of indexes that is associated with the first MCS.

13. The network entity of claim 12, wherein the one or more processors are individually or collectively further operable to execute the code to cause the network entity to:

output a second downlink control message that configures the MCS table at the UE.

14. The network entity of claim 11, wherein:

the UE is configured with an MCS-spectral efficiency (SE) table for transmission of uplink control messages that comprises a set of SE values each associated with a respective MCS value;

the data MCS indicator indicates that the uplink data channel is associated with the second MCS which is associated with a second SE value;

a division between the second SE value and the MCS backoff value is equal to a first SE value; and the second MCS is associated with an SE value of the set of SE values that is closet closest in value to the first SE value.

15. The network entity of claim 14, wherein the one or more processors are individually or collectively further operable to execute the code to cause the network entity to:

output a second downlink control message that indicates for the UE to use the MCS-SE table from a plurality of MCS-SE tables configured at the UE for transmission of uplink control messages.

16. The network entity of claim 10, wherein the downlink control message is a downlink control information (DCI) message that indicates the first MCS associated with the uplink control message and the second MCS associated with the uplink data channel.

17. The network entity of claim 16, wherein the one or more processors are individually or collectively further operable to execute the code to cause the network entity to:

output, as part of the DCI message, an MCS backoff value associated with the second MCS, wherein;

a first set of bits of the MCS backoff value indicate a scaling factor for a first spectral efficiency (SE) value of the uplink control message relative a second SE value for the uplink data channel;

a second set of bits of the MCS backoff value indicate the second modulation order; and the second MCS is based at least in part on the first SE value and the second modulation order.

18. The network entity of claim 16, wherein the one or more processors are individually or collectively further operable to execute the code to cause the network entity to:

output, as part of the DCI message, an uplink control MCS indicator indicating that the first MCS is associated with the first modulation order and a first code rate and a data MCS indicator indicating that the second MCS is associated with the second modulation order and a second code rate.

19. A method for wireless communications, at a user equipment (UE), comprising:

receiving, from a network entity, a downlink control message indicating the UE to multiplex an uplink control message associated with a first modulation and coding scheme (MCS) on an uplink data channel associated with a second MCS, wherein the first MCS has a first modulation order and the second MCS has a second modulation order that is different than the first modulation order;

multiplexing, based at least in part on the downlink control message, the uplink control message associated with the first MCS on the uplink data channel associated with the second MCS to generate a multiplexed uplink message comprising the uplink control message multiplexed with uplink data of the uplink data channel; and transmitting, via a wireless communications link between the network entity and the UE, the multiplexed uplink message.

20. The method of claim 19, further comprising:

receiving, as part of the downlink control message, an indication of a data MCS indicator associated with the second MCS and an MCS backoff value, wherein the first MCS is based at least in part on the data MCS indicator and the MCS backoff value.

* * * * *